United States Patent
Dabbs et al.

(10) Patent No.: US 12,199,806 B2
(45) Date of Patent: Jan. 14, 2025

(54) MULTIPLE-CHANNEL WIRELESS NETWORK SYSTEM

(71) Applicant: CRITICAL RESPONSE SYSTEMS, INC., Decatur, GA (US)

(72) Inventors: James M. Dabbs, Atlanta, GA (US); Brian Claise, Buford, GA (US)

(73) Assignee: CRITICAL RESPONSE SYSTEMS, INC., Decatur, GA (US)

( * ) Notice: Subject to any disclaimer, the term of this patent is extended or adjusted under 35 U.S.C. 154(b) by 452 days.

(21) Appl. No.: 17/625,600

(22) PCT Filed: Jul. 8, 2020

(86) PCT No.: PCT/US2020/041150
§ 371 (c)(1),
(2) Date: Jan. 7, 2022

(87) PCT Pub. No.: WO2021/007292
PCT Pub. Date: Jan. 14, 2021

(65) Prior Publication Data
US 2022/0263700 A1    Aug. 18, 2022

Related U.S. Application Data

(60) Provisional application No. 62/871,448, filed on Jul. 8, 2019.

(51) Int. Cl.
*H04J 3/06* (2006.01)
*H04L 27/26* (2006.01)
(Continued)

(52) U.S. Cl.
CPC ......... *H04L 27/2655* (2013.01); *H04W 4/70* (2018.02); *H04W 4/80* (2018.02); *H04W 56/001* (2013.01); *H04W 84/18* (2013.01)

(58) Field of Classification Search
CPC ...... H04L 27/2655; H04L 67/12; H04W 4/70; H04W 4/80; H04W 56/001; H04W 84/18; H04W 76/15; Y02D 30/70
See application file for complete search history.

(56) References Cited

U.S. PATENT DOCUMENTS

2016/0261306 A1*  9/2016  Seller ..................... G01S 5/021
2018/0006865 A1*  1/2018  Lee ..................... H04L 27/2662
2020/0220673 A1*  7/2020  Chang .................. H04W 16/14

FOREIGN PATENT DOCUMENTS

KR        101887627 B1    8/2018
WO        2019/032983 A1  2/2019

OTHER PUBLICATIONS

Haxhibeqiri, J. et al. "LoRa Scalability: A Simulation Model Based on Interference Measurements"; Sensors; Publication [online]. May 23, 2017 (May 23, 2017) [retrieved Sep. 6, 2020]. Retrieved from the Internet: <URL: https://www.ncbi.nlm.nih.gov/pmc/articles/PMC5490692/>; pp. 1-25.

(Continued)

*Primary Examiner* — Edan Orgad
*Assistant Examiner* — Hidayat Dabiri
(74) *Attorney, Agent, or Firm* — Dickinson Wright PLLC

(57) ABSTRACT

Devices, systems and methods implement a synchronized, multi-channel wireless network having a low-power, wireless wide-area network (LPWAN) architecture that makes narrowband radio frequency channels useful for Machine-to-Machine (M2M) and Internet of Things (IoT) applications, and is scalable. A control stack controls delivery of API client datagrams to nodes via base transceivers using forward channels and nodes respond using reverse channels. Forward and reverse channels are synchronized and grouped into sectors or areas of coverage. Forward channel framing structures and node processes allow nodes to remain in inactive, low power state for long periods of time, and (Continued)

consider large numbers of possible RF channels in a time-efficient and energy-efficient manner.

10 Claims, 11 Drawing Sheets

(51) Int. Cl.
   *H04W 4/70* (2018.01)
   *H04W 4/80* (2018.01)
   *H04W 56/00* (2009.01)
   *H04W 84/18* (2009.01)

(56) References Cited

OTHER PUBLICATIONS

International Search Report and Written Opinion dated Sep. 24, 2020, which issued in the corresponding PCT Patent Application No. PCT/US2020/041150.

\* cited by examiner

MULTIPLE-CHANNEL WIRELESS NETWORK SYSTEM

This application is a 371 of international PCT Patent Application No. PCT/US2020/041150, filed Jul. 8, 2020, which claims the benefit of U.S. Provisional Application Ser. No. 62/871,448, filed Jul. 8, 2019, the entire contents of which are incorporated herein by reference.

BACKGROUND

Field

The present disclosure and illustrative embodiments relate to the field of digital telecommunications, and relate more specifically to a method and system architecture for remote mobile nodes to communicate with a wireless network system.

Description of Related Art

The need to collect data from and send data to an increasingly broad range of electronic devices is driving innovation beyond well-established networking models (for instance, the Internet Protocol) into wireless networks designed specifically to minimize node power consumption. These solutions, called low-power wide area networks (LPWANs) are largely divided into two general classes, license free solutions and cellular-based solutions.

License-Free Solutions

This class of LPWAN includes LoraWAN, Sigfox, Weightless, and others, with users operating both private and public networks. Nodes operate using a block of license-free spectrum (e.g., 169 MHz, 433 MHz, 868 MHz, 915 MHz bands), which are available across much of the globe on a non-exclusive, non-coordinated basis.

These systems have the advantage that end-to-end solutions can be deployed quickly and cheaply, without FCC licensing or recurring commercial network charges. Their disadvantage is that, while the protocols attempt to mitigate the effects of interference, interference itself is not coordinated or controlled through any regulatory framework. As deployment of this type of network increases, interference will also increase and limit their range and throughput performance over time.

Cellular Service Solutions

Cellular companies have offered machine-to-machine solutions for decades, dating back to CDPD and before that to cellemetry and other analog technologies. Since then, cellular technologies have evolved into LPWAN solutions, with LTE-M representing the current state-of-the-art and NB-IOT representing a likely emerging next step.

These systems have the advantage of in-place, existing global infrastructure with well-understood coverage, and mass-produced, cost-effective node transceivers. Their disadvantage is their recurring per-unit cost, and a dependence on commercial networks that precludes their use in some mission-critical systems. It is not clear whether private LTE and 5G systems will develop into cost-effective and robust LPWAN solutions, since the level of independence, spectrum availability, and total cost of ownership of private LTE and 5G is unproven at present.

An Alternative: Private Narrowband Spectrum

Private narrowband spectrum, such as that used by P25, TETRA, and DMR voice and data systems, offers unique benefits for LPWANs. These channels are licensed for exclusive use, with high power base-to-mobile channels and a predictable, low noise floor over a geographic area. Narrowband channel allocations are available for business as well as local, state, and federal government users in many areas for a modest license fee, with a data communication radius of 3-15 miles per site. They offer high reliability for "the mission-critical Internet of Things" such as wastewater management, water quality monitoring, perimeter security, asset tracking, public safety, and similar applications. The downside to this type of spectrum is that it is site-licensed, with channel availability varying from location to location. Any regional or larger system would be unlikely to have a common control channel or set of control channels. Mobile nodes would need to roam between channels—potentially many channels—to achieve effective regional or nationwide coverage. Also, a "land mobile LPWAN" would need to co-exist with nearby voice and data systems, requiring transceivers with high channel selectivity and immunity to near-far problems and other RF-level challenges. For instance, in general, it would not be generally feasible for a low-cost, low-power node to digitize an entire private wireless band as can be done with cellular or ISM frequencies.

While a practical LPWAN using private narrowband channels would be new, the use of narrowband spectrum for machine-to-machine communication is well understood. National Mobitex and RD-LAP networks existed in the 1990's, using 900 MHz and 800 MHz 12.5 KHz channels. These networks offered OEM data solutions, including the Ericsson M3090 Radio Modem and CML FX929B IC. However, as a practical matter, power consumption on these networks limited battery life to several days, far below that of current LPWAN technologies. Additionally, both of these network types relied on nationwide narrowband channels, which are not available today except at extreme cost.

In addition to Mobitex and RD-LAP networks, paging carriers launched ReFLEX two-way paging networks in the early 2000's, which operate over 12.5 KHz or 10 KHz channels in the NPCS bands as well as the 935-940/896-901 MHz bands. These systems addressed node power consumption more aggressively than Mobitex or RD-LAP, including a "collapse" parameter that allowed mobile units to save power by skipping forward channel frames. These systems also aggregated multiple narrowband channels into zones of coverage, used simulcast high-power forward channels, and offered one-to-many messaging at the MAC layer. While the main service offered by these networks was two-way paging, they also offered machine-to-machine capabilities, with several telemetry modules such as the Motorola CreataLink 2XT being available for OEM designs. However, like Mobitex and RD-LAP, ReFLEX networks relied on nationwide narrowband channels, which are not available today except at extreme cost, and they only achieved a mobile transceiver battery life of a few days.

In terms of actual site-based, private narrowband channels, DMR, P25, and TETRA specifications currently support machine-to-machine data transmission, and manufacturers offer various solutions for machine-to-machine data over private channels using these technologies. Examples include P25-based automatic vehicle location (AVL) and alerting solutions, and DMR-based SCADA solutions. While these approaches can indeed support mission-critical machine-to-machine systems using private spectrum and network equipment, this type of mobile equipment requires relatively high operating power. Also, while these systems do support limited roaming for purposes of interoperability, the sheer number of channels and degrees of freedom required for a wide-area LPWAN solution are not feasible.

SUMMARY

The above and other problems are overcome, and additional advantages are realized, by illustrative embodiments.

In the largest possible context, how to actually realize the benefits of private narrowband channels for an LPWAN system is not obvious from the above-described technologies. In accordance with example embodiments described below, a technical solution is provided that comprises a system architecture with top-to-bottom support for these types of channels. Such an architecture is suitable for single-site deployments with a few nodes, but is also scalable to much larger systems with many nodes. This scalability also includes an efficient roaming algorithm in which a mobile node can consider a potentially large number of total possible channels, in both a time-efficient and energy-efficient manner. The MAC layer of the system of the illustrative embodiments permits nodes to sleep for long periods of time, and uses modulations compatible with multiple channel bands, for example, private land-mobile radio, paging, N-PCS, and MAS frequency bands. The receivers used in such a system in accordance with example embodiments manages near-far scenarios and other challenges familiar to private wireless systems, and in some cases, depending on regulatory regimes, also supports an allowed primary use (e.g., personal alerting) in addition to LPWAN functionality on a secondary basis.

As recited in the claims, a base transceiver (BX) processing device can be, but is not limited to, a controller or other processing device (e.g., a programmed processor or FPGA device) and/or software module(s) implemented by one or more processing devices. In addition, the recited BX processing device can be implemented from the control stack, a base transceiver, or other location in the system that sends packets to nodes via forward channels and receives packets from nodes via reverse channels.

In accordance with illustrative embodiments, and in a digital time division multiple access and frequency division multiple access communication system wherein one or more base transceivers communicate with nodes in a low power wide area network (LPWAN) using radio frequency forward channels and radio frequency reverse channels, a base transceiver comprises: base transceiver (BX) subcomponents chosen from at least one receive subsystem comprising an antenna, an amplifier, a filter, a demodulator, and a decoder for receiving wireless signals in the LPWAN, at least one transmit subsystem comprising an encoder, a modulator, a filter, an amplifier, and an antenna for transmitting wireless signals in the LPWAN, an oscillator and clock subsystem—and digital memory; and a BX processing device configured to operate the BX subcomponents to transmit on forward channels a plurality of synchronization symbols in synchronization symbol positions and a plurality of data symbols located between synchronization symbols, and to receive on reverse channels from one or more fixed or mobile nodes reverse channel data symbols that are synchronized to forward channel synchronization symbols. The LPWAN comprises sectors which have respective sector identifiers and groups of forward channels and reverse channels assigned to each of the sectors. The BX processing device is further configured to generate frames for transmission on the forward channels via the transmit subsystem, each of the frames comprising a header and a data field, the header comprising a synchronization field, a sector information field, a resynchronization field, and a frame information field, the synchronization field and the frame information field comprising information to enable a node to synchronize to the frames and symbols of a forward channel and correct frequency offset between the node and the base transceiver, the sector information field comprising sector configuration information, and the resynchronization field comprising resynchronization information that a node can use to resynchronize to the corresponding forward channel after synchronizing to and receiving the sector information field of a different forward channel.

In accordance with aspects of illustrative embodiments, the BX processing device is configured to transmit to nodes, via the transmit subsystem, sector configuration information comprising sector configuration version information that alerts a node if the sector configuration information stored at the node needs updating.

In accordance with aspects of illustrative embodiments, the BX processing device broadcasts the sector configuration information periodically within the sector and tags the broadcasted sector configuration information with a sector configuration nonce as a form of version control that informs nodes when sector configuration changes have occurred.

In accordance with aspects of illustrative embodiments, the BX processing device provides the sector configuration nonce in the sector information field in the headers of frames in forward channels.

In accordance with aspects of illustrative embodiments, the sector information field comprises information chosen from a sector identifier, a system identifier, and a schedule of forward frames containing additional sector configuration information.

In accordance with aspects of illustrative embodiments, the BX processing device assigns a connection nonce to a connection information database of a sector that comprises a home location register and a visited location register, the connection nonce being recorded at each node that connects to the sector to allow the node to determine when it has been disconnected from the sector.

In accordance with aspects of illustrative embodiments, the BX processing device provides the connection nonce in the headers of frames in forward channels.

In accordance with aspects of illustrative embodiments, the BX processing device is configured, via the transmit subsystem to modulate data symbols in a payload on the forward channel using four frequency shift keying (FSK) symbols corresponding to four levels of frequency modulation offsets and carrying two bits of payload data information, and a fifth zero symbol carrying information related to a center frequency of the forward channel and no payload data information, to enable nodes to perform synchronization and frequency correction when demodulating the forward channel.

In accordance with aspects of illustrative embodiments, the BX processing device is configured to generate the frames with the data field having two interleaved blocks comprising a first block having address codewords indicating a primary address for an addressed node or a multicast address for an addressed group of nodes, and a second block having forward channel packet data and other information, the first block being configured with the address codewords and having a shorter length than the second block to allow a node to decode the first block and power down upon determining the address codewords are not addressed to it.

In accordance with aspects of illustrative embodiments, the BX processing device is configured to assign a node availability (NA) value a node that corresponds to how often the node scans for and receives frames in a forward channel, and to provide an API client with an estimated delivery time for when a datagram from the API client will be delivered to the node via a forward channel that is based on the NA value.

In accordance with illustrative embodiments, in a digital time division multiple access and frequency division multiple access communication system wherein one or more base transceivers communicate with nodes in a low power wide area network (LPWAN) using radio frequency forward channels and radio frequency reverse channels, the base transceivers transmitting on forward channels a plurality of synchronization symbols in synchronization symbol positions and a plurality of data symbols located between synchronization symbols, a node comprises: node subcomponents chosen from from at least one receive subsystem comprising an antenna, an amplifier, a filter, a demodulator, and a decoder for receiving wireless signals in the LPWAN, at least one transmit subsystem comprising an encoder, a modulator, a filter, an amplifier, and an antenna for transmitting wireless signals in the LPWAN, digital memory, and a battery; and a node processing device configured to selectively operate the node subcomponents to control the node in operation states chosen from a transmit state wherein the node transmits reverse channel data symbols that are synchronized to forward channel synchronization symbols from a base transceiver, a receive state wherein the node receives and decodes at least one forward channel, an indeterminate state during which the node may not be connected in a sector, and a low power sleep state during which the node is conserving power by not transmitting on a reverse channel or receiving on a forward channel. The node is provided with node configuration data indicating when the node is to leave the sleep state and enter the receive state to perform a wake up operation comprising scanning a forward channel to receive and decode data symbols therein that are addressed to the node.

In accordance with aspects of illustrative embodiments, the LPWAN comprises sectors having respective sector identifiers and groups of forward channels and reverse channels assigned to each of the sectors, and the node configuration data comprises connection information chosen from a primary MAC address, a multicast MAC address, a system identifier for a home network associated with the node comprising one or more base transceivers from which the node can receive data symbols on forward channels, one or more encryption keys, and a list of forward channel radio frequencies to be scanned by the receive subsystem during a sector acquisition process.

In accordance with aspects of illustrative embodiments, when the node is not connected to a sector, the node processing device is configured to perform the sector acquisition process via candidate forward channel list construction, candidate sector list construction, and sector connection. Further, during candidate forward channel list construction, the node processing device tunes the receive subsystem to frequencies in the node configuration data list of forward channel radio frequencies for a designed time period and measures their respective received signal strengths, and generates the candidate forward channel list by removing frequencies from the node configuration data list whose received signal strengths fail to meet a designated received signal strength threshold.

In accordance with aspects of illustrative embodiments, during candidate sector list construction, the node processing device is further configured to tune the receive subsystem to frequencies in candidate forward channel list and attempt to receive and decode sector information field provided in a forward channel frame header by a base transceiver; add the frequencies to a frequency lockout list when the sector information field cannot be successfully decoded and when a decoded system identifier in a successfully decoded sector information field does not correspond to the system identifier in the node configuration data; and add a sector identifier to the candidate sector list when it has been decoded from the sector information field and not added to the lockout list.

In accordance with aspects of illustrative embodiments, the node processing device is further configured to connect to a sector selected from the candidate sector list using a connection packet transaction.

In accordance with aspects of illustrative embodiments, the node processing device is further configured to determine a priority among sector identifiers in the candidate sector list for initiating a connection packet transaction, the priority based on criteria chosen from system priority value, sector priority value, and relative signal strength measurements.

In accordance with aspects of illustrative embodiments, the node processing device is further configured to add a sector identifier decoded from the sector information field and related decoded sector configuration information to a stored list of observed sectors if not currently listed; compare version information of the decoded sector identifier to version information of a corresponding sector identifier currently listed in the list of observed sectors and delete the corresponding sector identifier therefrom of the version information does not match; and connect to a sector selected from the candidate sector list using corresponding decoded sector configuration information from the list of observed sectors.

In accordance with aspects of illustrative embodiments, when the node is connected to a sector, the node processing device is configured to perform the sector acquisition process via the candidate forward channel list construction by measuring received signal strengths of frequencies in the candidate forward channel list during a sector information field of forward channel frame headers.

In accordance with aspects of illustrative embodiments, the node processing device is configured to synchronize to a frame synchronization field in a frame header in the forward channel in use as a control channel for the sector, tune the receive subsystem to scan frequencies for energy level in the candidate forward channel list during a sector information field in the frame header and then return to the control channel to receive the data symbols in the frame.

In accordance with aspects of illustrative embodiments, the node configuration data comprises a node availability (NA) value that corresponds to how often the node performs a wake up operation to scan for and receive frames in a forward channel.

In accordance with aspects of illustrative embodiments, the LPWAN comprises sectors having respective sector identifiers and groups of forward channels and reverse channels assigned to each of the sectors, and the node is provided with sector configuration data relating to one or more of the sectors, and the node processing device determines a set of forward frames the node will attempt to receive and decode based on the node configuration data and the sector configuration data to, and uses the NA value to modify the forward frames set the node will attempt to receive and decode.

In accordance with aspects of illustrative embodiments, the node processing device is configured to override the forward frames set and receive and decode additional forward frames or modify the forward frames set in response to control signals received from a base transceiver.

In accordance with aspects of illustrative embodiments, the node further comprises a global position determination subsystem that provides current position information for the node, and the node processing device is further configured to obtain base transceiver information chosen from latitude, longitude, frequency, and transmission radius of each base transceiver and determine the list of forward channel radio frequencies based on its position information and base transceiver information for nearby base transceiver.

In accordance with illustrative embodiments, a method of operating a node in a digital time division multiple access and frequency division multiple access communication system wherein one or more base transceivers communicate with nodes in a low power wide area network (LPWAN) using radio frequency forward channels and radio frequency reverse channels, the LPWAN comprising sectors having respective sector identifiers and groups of forward channels and reverse channels assigned to each of the sectors is provided, the method comprising: receiving frames in a forward channel in current use as a control for the node, each frame comprising a header and a data field, the header comprising a synchronization field, a sector information field, a resynchronization field, and a frame information field, the data field comprising data symbols for transmission to one or more addressed nodes; synchronizing to the frames and synchronization symbols in the forward channel and correcting frequency offset between the node and a base transceiver using information in the synchronization field and the frame information field in the header of a frame; synchronizing to and receiving the sector information field on a different forward channel during the synchronization field and the sector information field in the header of the frame; and resynchronizing to the control channel during the resynchronization field after synchronizing to and receiving the sector information field of the different forward channel.

In accordance with aspects of illustrative embodiments, the method further comprises controllably operating the node in operation states chosen from a transmit state wherein the node transmits reverse channel data symbols that are synchronized to forward channel synchronization symbols from a base transceiver, a receive state wherein the node receives and decodes at least one forward channel, an indeterminate state during which the node may not be connected in a sector, and a low power sleep state during which the node is conserving power by not transmitting on a reverse channel or receiving on a forward channel.

In accordance with aspects of illustrative embodiments, the method further comprises: switching from the low power sleep state to the receive state; receiving sector configuration information comprising sector configuration version information from a base transceiver; comparing the received sector configuration version information with previously stored sector configuration version information at the node and determining whether the stored sector configuration information requires updating, and deferring receiving and decoding sector configuration information from the base transceiver until the stored sector configuration version information indicates that the stored sector configuration information requires updating.

In accordance with aspects of illustrative embodiments, the method further comprises: switching from the low power sleep state to the receive state; receiving system connection information comprising version information from a base transceiver; comparing the received version information with previously stored system connection version information at the node and determining whether the node has been disconnected from its sector, and initiating a connection packet transaction to reconnect with the sector.

In accordance with aspects of illustrative embodiments, the data field has two interleaved blocks comprising a first block having address codewords indicating a primary address for an addressed node or a multicast address for an addressed group of nodes, and a second block having forward channel packet data and other information, the first block being configured with the address codewords and having a shorter length than the second block, and the method further comprises: receiving and decoding a frame header for a frame; receiving and decoding at least the first block in the data field of the frame; and transitioning the node from the receive state to the lower power sleep state in response to determining that the address codewords do not correspond to an address of the node.

In accordance with aspects of illustrative embodiments, the method further comprises: storing node configuration data comprising a system identifier for a home network associated with the node, and a list of forward channel radio frequencies to be scanned by the node during a sector acquisition process; scanning frequencies in the node configuration data list of forward channel radio frequencies for a designed time period and measuring their respective received signal strengths; and generating a candidate forward channel list by removing frequencies from the node configuration data list whose received signal strengths fail to meet a designated received signal strength threshold.

In accordance with aspects of illustrative embodiments, the method further comprises: tuning a node receive subsystem to frequencies in the candidate forward channel list and attempting to receive and decode a sector information field provided in a forward channel frame header by a base transceiver; adding the frequencies to a frequency lockout list when the sector information field cannot be successfully decoded or when a decoded system identifier in a successfully decoded sector information field does not correspond to the system identifier in the node configuration data; and adding a sector identifier to the candidate sector list when it has been decoded from the sector information field and not added to the lockout list.

In accordance with aspects of illustrative embodiments, the method further comprises connecting to a sector selected from the candidate sector list using a connection packet transaction.

In accordance with aspects of illustrative embodiments, the method further comprises determining a priority among sector identifiers in the candidate sector list based on criteria chosen from system priority value, sector priority value, and relative signal strength measurements.

In accordance with aspects of illustrative embodiments, the method further comprises: storing node configuration data comprising a system identifier for a home network associated with the node comprising one or more base transceivers from which the node can receive data symbols on forward channels, and a list of forward channel radio frequencies to be scanned by the node during a sector acquisition process. When the node is connected to a sector, the node processing device is configured to perform the sector acquisition process via the candidate forward channel list construction by measuring received signal strengths of frequencies in the candidate forward channel list during a sector information field of forward channel frame headers.

Additional and/or other aspects and advantages of illustrative embodiments will be set forth in the description that follows, or will be apparent from the description, or may be learned by practice of the illustrative embodiments. The illustrative embodiments may comprise apparatuses and methods for operating same having one or more of the above aspects, and/or one or more of the features and combinations thereof. The illustrative embodiments may comprise one or more of the features and/or combinations of the above aspects as recited, for example, in the attached claims

BRIEF DESCRIPTION OF THE DRAWINGS

The above and/or other aspects and advantages of the illustrative embodiments will be more readily appreciated from the following detailed description, taken in conjunction with the accompanying drawings, of which.

Throughout the drawing figures, like reference numbers will be understood to refer to like elements, features and structures.

DETAILED DESCRIPTION OF ILLUSTRATIVE EMBODIMENTS

Figure 1:
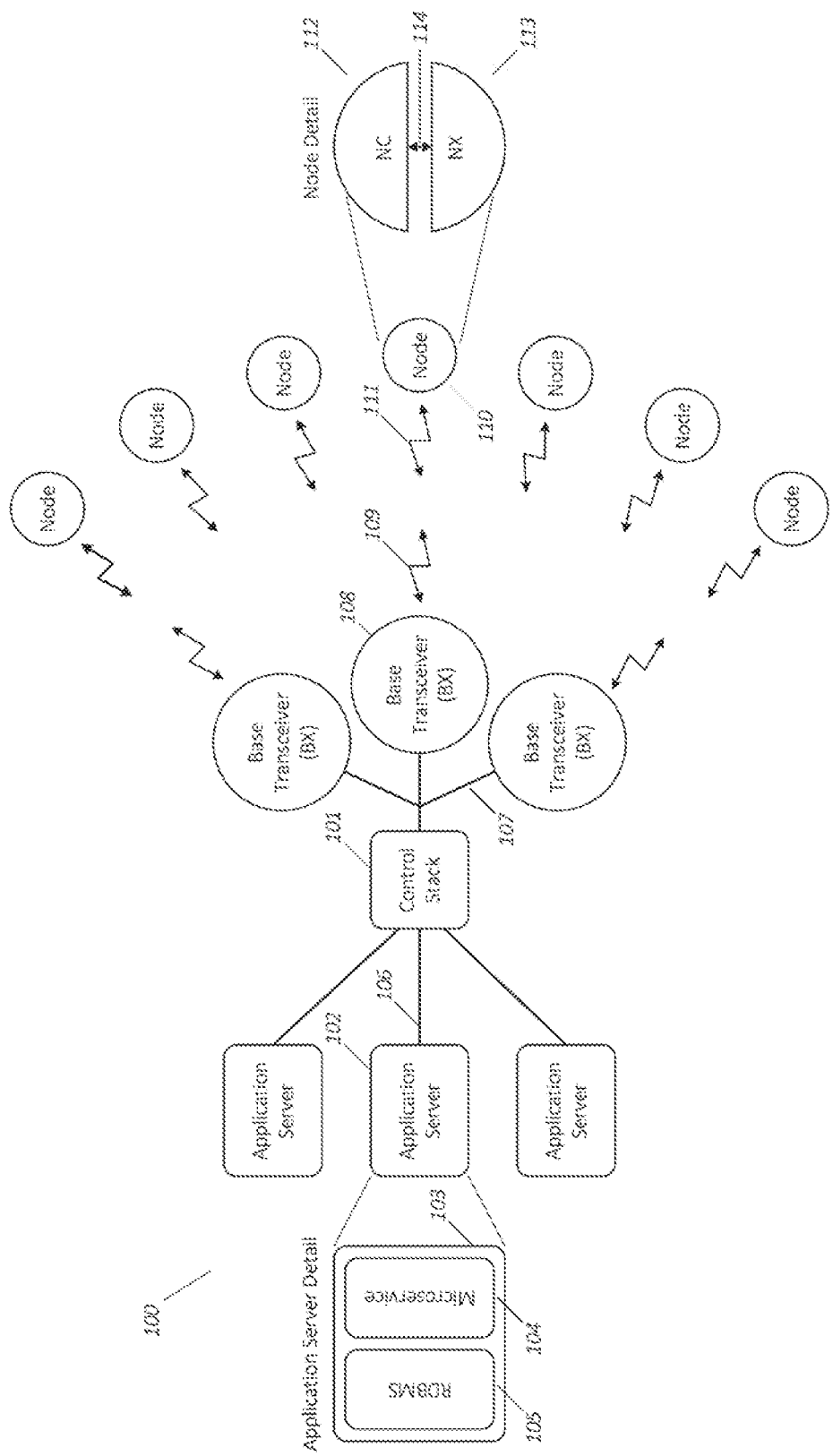
FIG. 1 depicts a system overview of an illustrative embodiment.

Reference will now be made in detail to illustrative embodiments, which are depicted in the accompanying drawings. The embodiments described herein exemplify, but do not limit, the illustrative embodiments by referring to the drawings.

In accordance with advantageous aspects of the technical solutions provided by example embodiments described herein, a low-power, wireless wide-area network (LPWAN) architecture is provided that makes narrowband radio frequency channels useful for Machine-to-Machine (M2M) and Internet of Things (IoT) applications. The architecture is suitable for single-site deployments with a few nodes, but is also scalable to much larger systems with many nodes. This scalability is realized by an efficient roaming algorithm in which a mobile node can consider a potentially large number of total possible radio frequency channels in both a time-efficient and energy-efficient manner. The MAC layer of the system permits nodes to sleep in an inactive low-power state for long periods of time, and uses modulations compatible with multiple bands, for example, private land-mobile radio, paging, N-PCS, and MAS frequency bands. The receivers of nodes used in the system are configured to manage near-far scenarios and other challenges familiar to private wireless systems. In some cases, depending on regulatory regimes, system is configured to support an allowed primary use (e.g., personal alerting) in addition to LPWAN functionality on a secondary basis.

Overview

With reference to FIG. 1, an illustrative embodiment of a wireless network system 100 is shown, enabling nodes 110 to exchange messages ("datagrams") with application servers 102. The wireless network system includes a control stack 101, one or more base transceivers ("BXs") 108, one or more nodes 110, and one or more application servers 102.

The control stack 101 serves as a network controller, as well as a home location register and visited location register. BXs 108 serve as radio frequency interfaces for the control stack 101. Nodes comprise a node controller ("NC") 112 and a node transceiver ("NX") 113, with the NC 112 and NX 113 connected by a node transceiver interface ("NXI") 114. Application servers 102 comprise a software microservice 104 plus a relational database management system 105, although they may take other forms, such as an embedded appliance. Nodes 110 interface to the wireless network system 100 through their NXs 113, while application servers 102 interface to the wireless network system 100 using an application programming interface ("API") 106. Example nodes 110 include weather monitors, programmable logic controllers, personal alerting devices, location tags, and other connected objects, which may be fixed or mobile. Applications servers include automatic meter reading systems, irrigation system, security systems, first-responder alerting systems, and other systems.

The wireless network system 100 uses both forward radio frequency channels ("forward channels") and reverse radio frequency channels ("reverse channels"). BXs transmit signals to NXs on forward channels and receive signals from NXs on reverse channels 109. Likewise, NXs transmit signals to BXs on reverse channels and receive signals from NXs on forward channels 111. BX transmissions are organized into 3,840 forward frames per hour, each of which contain forward packets as well as control and supervisory information. NX transmissions consist of reverse packets, which are scheduled according to timing slots, using slotted ALOHA random access as well as scheduling information in forward packets. Reverse channel slots are organized into reverse frames, which are synchronized to forward frames, which are synchronized to GPS. The wireless network system 100 breaks individual datagrams into packets, which are transferred between NXs 113 and the control stack 101.

Forward and reverse channels are grouped into basic coverage units called sectors. Each sector is identified by its sector identifier, and globally identified in dot-decimal notation by its system identifier followed by its sector identifier. In in the illustrative embodiment, the term "sector" varies from the directional sector concept used in a cellular system. In the illustrative embodiment, a sector may be as small as a building or campus, or as large as a country, and may be geographically contiguous or non-contiguous. Sectors include one or more forward channels and one or more reverse channels. Forward channels are identified within their sector by their forward channel identifier, and they are globally identified in dot-decimal notation by their system identifier, followed by their sector identifier, followed by their forward channel identifier. Similarly, reverse channels are identified within their sector by their reverse channel identifier, and they are globally identified in dot-decimal notation by their system identifier, followed by their sector identifier, followed by their reverse channel identifier. Sectors include one or more BXs and a set of operating parameters called their sector configuration.

Sector configuration information is broadcast periodically within the sector and tagged with a sector configuration nonce as a form of version control, efficiently informing NXs 113 when sector configuration changes. As described herein, the use of the term "nonce" diverges to an extent from its use in the field of cryptography; that is, for purposes of the illustrative embodiments, a nonce is a unique number assigned to a specific configuration or database version.

Before transmitting or receiving datagrams, NXs 113 connect to a sector using a process called sector acquisition. Once connected to a sector, each NX 113 and control stack 101 mutually establish a set of forward frames that the NX 113 will attempt to receive and decode. The forward frame set is variable per-node, and is established using a node availability ("na") value which determines how many frames the NX 113 will decode. The more forward frames decoded by the NX 113, the faster its latency and the greater its energy consumption. Nodes set to lower values receive more frames but consume more energy; nodes with higher values receive fewer frames but consume less energy. Being a synchronous system with GPS-timed frames, the node availability value translates into a real-time delivery estimate that can be made available to clients sending forward datagrams. The connection database of a sector, including the home location register and visited location register, is assigned a version tag called the connection nonce. In the case where the connection database changes, the connection nonce also changes. A connection nonce serves as a form of version control for connection-related data, including relevant home location registers and visited location registers. A change to the connection nonce informs connected NXs 113 when they have been disconnected, after, for instance, a data recovery operation or system upgrade at the control stack.

In the illustrative embodiment, the control stack 101 comprises a set of microservices running on commodity server hardware. The control stack connects to one or more BXs 108 using an IP protocol 106, to which it sends forward frames, and from which it receives reverse packets and GPS timing information. A control stack 101, its BXs 108, and its sectors, are collectively called a system. Systems are identified by a system identifier. Each node 110 conceptually belongs to one system, referred to as the node's home system, and one application server.

OSI Layer 1

BX (Base Transceiver)

Figure 2:
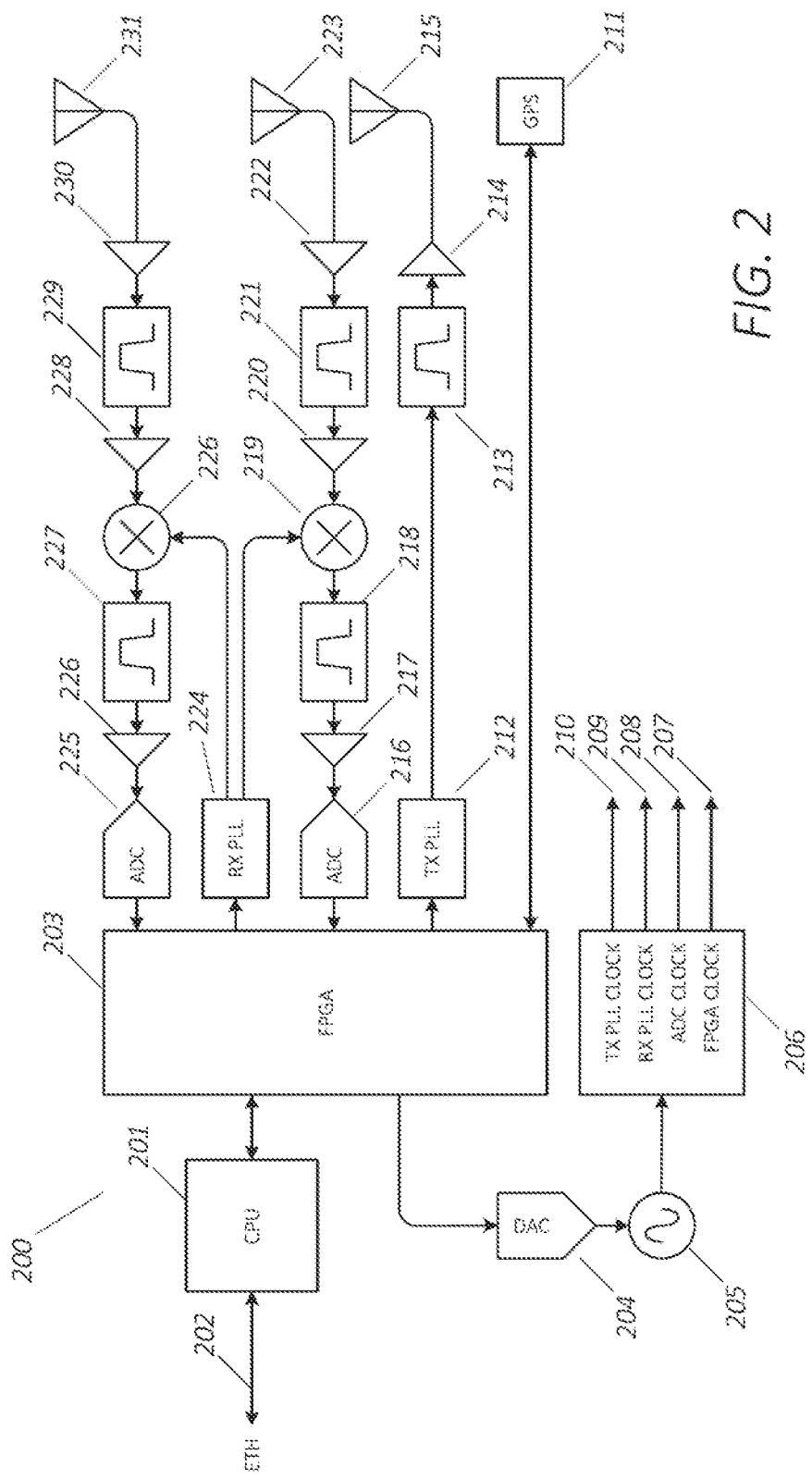
FIG. 2 is a block diagram of a base transceiver (BX) in FIG. 1 in accordance with an illustrative embodiment.

With reference to FIG. 2, an example embodiment of a BX 200 is shown. The CPU subsystem 201 includes a CPU, clock system, memory, nonvolatile storage, software, and connections to the FPGA 203, and Ethernet interface 202. The BX uses an Abracon AOCJY series oven controlled crystal oscillator (OCXO) 205 to generate a fundamental clock for its analog clock domain, which is converted into a set of 4 derivative clocks 207-210 of by a Texas Instruments LMK04906 based clock generation and distribution circuit 206. The FPGA 203 compares the phase of the clock distribution circuit output 206 (which it divides down to 1 Hz) to the one pulse-per-second signal from the GPS interface 211. The FPGA 203 uses the DAC 204 to drive the control voltage pin of the OCXO 205 in real time. The resulting phase locked loop keeps clocks 207-210 within a timing precision adequate to meet the emission mask governing use of the forward channel.

The clock distribution circuit 206 generates four clocks. The first clock 207 drives the FPGA 203. The second clock 208 drives the receive analog to digital converters 216 and 225. The third clock 209 drives the receive PLL 224, and the fourth clock 210 drives the transmit PLL 212.

The transmit circuit includes a LMX2571 PLL 212, a filter 213, and a power amplifier 214, plus associated circuitry. The FPGA 203 directly modulates the transmitted output signal using the FSK I2S mode of the PLL 212, which is then filtered 213, amplified 214, and driven to a transmit antenna 215. The FPGA generates I2S signals and other necessary signals to cause the PLL 212 to generate correctly-timed transmission waveforms. In cases where higher transmission power is required than can be supplied by amplifier 214, an external power amplifier is used.

The receive circuit includes two identical receiver subsystems, designed for receiver diversity, which connect to external base antennas 223 and 231. In the first receiver subsystem, the receive antenna 223 connects to the low noise amplifier (LNA) 222, which drives an amplified receive signal through a band filter 221 to another LNA 220. The second LNA 220 drives the RF input to a mixer 219, which down-converts the RF signal to an intermediate frequency (IF) signal by mixing it with the output of the receive PLL 224. The IF output of the mixer 219 is filtered by channel and image-rejection filter 218, then amplified 217 and presented to an analog-to-digital converter 216, which samples the signal using super-Nyquist sampling techniques. The second receive antenna 231 drives an identical parallel receiver subsystem including elements 225-230. The receive PLL 224 is a Texas Instruments LMX2571, which has dual outputs, allowing it to drive the LO inputs of both receive mixers 216 and 225. The FPGA 203 drives the LMX2571 224 FSK inputs in FSK PIN mode to compensate for any frequency drift detected in NX reverse channel transmissions. Samples from both receive subsystems are read by the FPGA 203 and processed using additional digital receiver processing techniques. The discrete antennas 215, 223, 231 may be combined using duplexers and combiners as necessary, depending on site requirements.

The FPGA performs digital signal processing on the receive data from analog-to-digital converters 216 and 225 before sending baseband symbols to the CPU 201. The FPGA digital signal processing includes filtering, digitally down-converting, and decimating each signal, demodulating each signal into baseband, performing root raised cosine filtering on each baseband, correcting any frequency offset between itself and the NX, and recovering the original symbols transmitted by the NX. This information is passed to higher-level software running on the CPU 201.

The FPGA 203 performs digital signal processing on the transmit data, which is received from software running on the CPU 201. The FPGA digital signal processing includes converting symbols into frequency modulation offsets compatible with the LMX2571 212 FSK I2S mode, interpolating and filtering the symbols using a root raised cosine filter, and sending the resulting interpolated, correctly-timed samples to the LMX2571 212 using the I2S interface.

Using the Ethernet interface 202, the BX uses an IP protocol (FIG. 1, 107) to receive forward frame data from, and transmit reverse packet data to, the system control stack (FIG. 1, 101).

NX (Node Transceiver)

Figure 3:
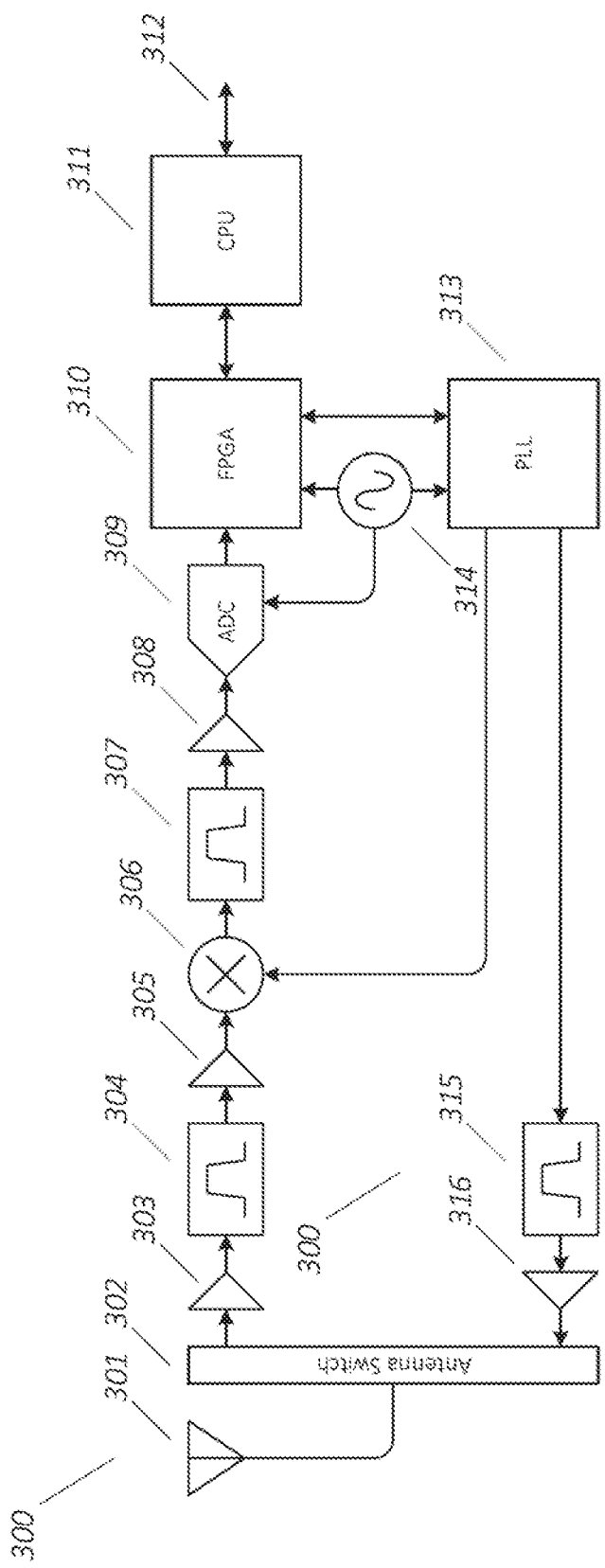
FIG. 3 is a block diagram of a node transceiver (NX) in FIG. 1 in accordance with an illustrative embodiment.

With reference to FIG. 3, an example embodiment of an NX 300 is shown. The NX 300 includes a CPU subsystem 311, which comprises a CPU, RAM, ROM, oscillator, and non-volatile storage. The CPU subsystem presents a node transceiver interface (NXI) 312 to a companion NC (FIG. 1, 112), and interfaces with a Lattice ICE40UP5K FPGA 310. The NX also includes a clock subsystem 314, comprising a VCTXO, buffers, and other circuitry to generates clocks for the FPGA 310, PLL 313, and analog-to-digital converter 309. Generally, the FPGA 310 interfaces with the LMX2571 PLL 313 and other circuitry, and controls the physical RF layer in a half-duplex fashion, switching between transmit, receive, and powered down states in real-time as directed by the CPU subsystem 311.

In receive mode, the FPGA 310 configures the antenna switch 302 to connect the antenna 301 to the LNA 303 and configures the PLL 313 to generate the appropriate receive mixing signal. The FPGA additionally powers down the transmit amplifier 316 as necessary. The LNA 303 drives an amplified antenna signal through the channel filter 304 to a second LNA 305. The second LNA further amplifies the signal and drives it into the RF input of a down-converting mixer 306. The IF output of the mixer 306 is then filtered by an image rejection and channel selection filter 307, amplified 308, and driven into the analog-to-digital converter 309, which samples the signal using super-Nyquist sampling techniques. While receiving, the FPGA 310 performs digital signal processing on the receive data from analog-to-digital converter 309 before sending base band symbols to the CPU subsystem 311. The FPGA filters, digitally down-converts, and decimates the signal, demodulates the signal into baseband, performs root raised cosine filtering on the baseband, and uses a synchronization field in the frame header to synchronize its receiver to symbols and forward frames. The synchronization field also allows the NX to determines frequency offset between the NX and the BX. The NX adjusts its carrier frequency and symbol decoding algorithm in real-time based on the frequency offset, and it also periodically adjusts its clock subsystem 314. The FPGA 310 passes frame and symbol information to the CPU subsystem 311.

In transmit mode, the FPGA 310 configures the antenna switch 302 to connect the antenna 301 to the transmit amplifier 316 and configures the PLL 313 to generate the appropriate transmit signal. The FPGA 310 additionally powers down the receiver amplifiers 302, 305, and 308, and mixer 306. At the correct time, based on symbol and frame synchronization determined while receiving, the FPGA begins modulation of the LMX2571 PLL 313 using FSK I2S mode and powers on the transmit amplifier 316. The FPGA transmits the packet data and then powers off the transmit circuit.

The CPU subsystem 311 completes layers 2 through 4 of the wireless network, sending and receiving datagrams to the NC using NXI 312 (also shown in FIG. 1, 114).

Data Transmission and Reception

TABLE 1

| Symbol | Bits | Deviation |
| --- | --- | --- |
| +3 | 01 | Fc + 1944 Hz |
| +1 | 00 | Fc + 648 Hz |
| 0 | n/a | Fc |
| −1 | 10 | Fc − 648 Hz |
| −3 | 11 | Fc − 1944 Hz |

With reference to Table 1, frequency modulated symbols used by BXs and NXs to transmit and receive data within the illustrative embodiment are shown. The modulation scheme includes four levels of FSK to transmit data, each carrying two bits of information, plus a fifth zero symbol used for synchronization and frequency correction. Each symbol is transmitted and received as one of five discrete frequency offsets from the carrier. The illustrative embodiment transmits all data at 4,800 symbols per second, yielding a total symbol rate of 9,600 bits per second.

To control out-of-band emissions while transmitting, BX and NX transmitters use a root raised cosine filter on baseband symbols prior to modulation. Similarly, to reduce the effects of channel noise, BX and NX receivers use a matching root raised cosine filter on baseband data after demodulation. Together, the transmit and receive root raised cosine filters reduce splatter, reduce the effects of channel noise, and reduce inter-symbol interference.

OSI Layer 2

Figure 4:
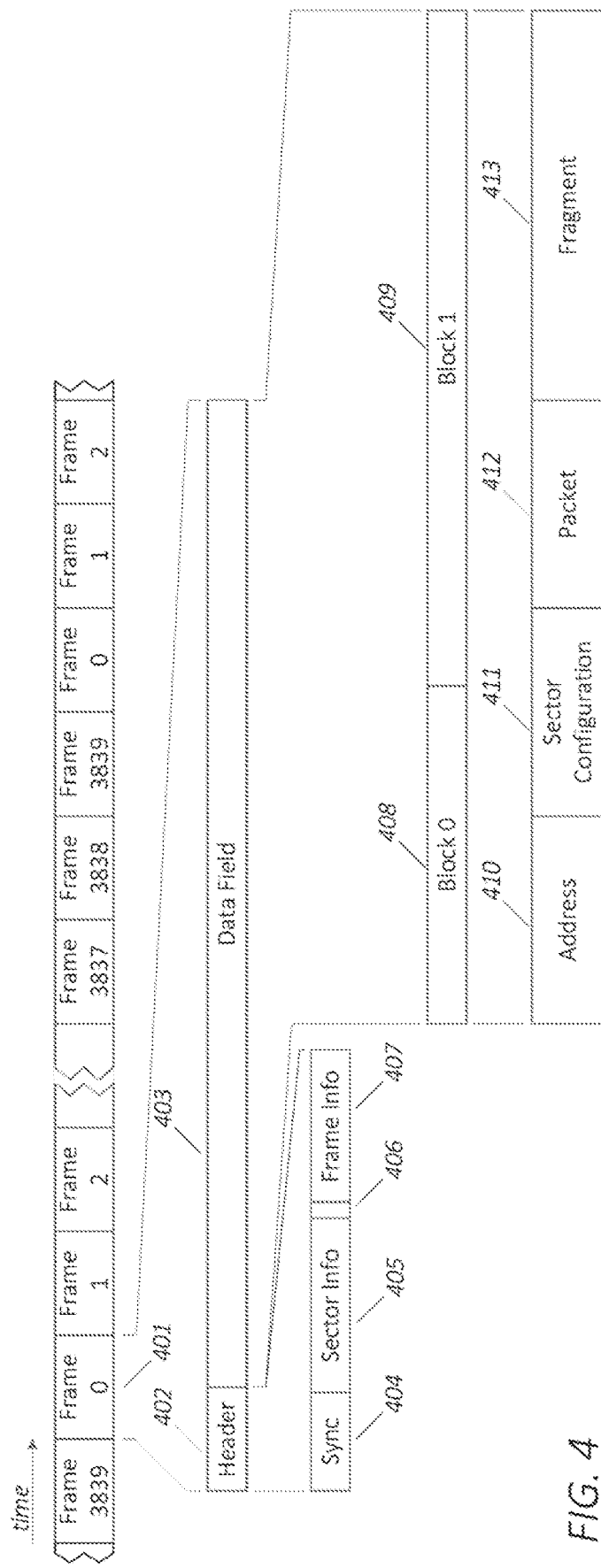
FIG. 4 is a diagram of the forward channel frame structure transmitted by BXs in accordance with an illustrative embodiment.

With reference to FIG. 4, an example embodiment of forward channel framing depicts the data framing as transmitted by BXs. Each forward channel frame 401 contains 4,500 symbols and occupies 0.9375 seconds. Each BX transmits forward frames sequentially, 3,840 frames per hour, each frame having an identifier 0 through 3,839. Forward frames are globally identified in dot-decimal notation using the system identifier, followed by the sector identifier, followed by the forward channel identifier, followed by the forward frame identifier. Each forward channel frame 401 is divided into a header 402 containing 212 symbols, and a data field 403 containing 4,288 symbols. Each frame header is further divided into a 48-symbol synchronization field 404, an 84-symbol sector information field 405, an 8-symbol dual purpose field 406, and a 72-symbol frame information field 407. Forward channel frames may be received by multiple NXs, which must decode all or part of each frame to determine whether they contain packets addressed to their primary or multicast MAC addresses.

The illustrative embodiment supports two structures for the header 402, Type A, supporting a wide range of geographical network sizes, and Type B, optimized for small campus-type systems (for instance, a hospital or factory). Type A headers use the dual-purpose field 406 as a resynchronization field between the sector information field 405 and frame information field 407, while Type B headers use the dual-purpose field 406 to hold a BX identifier. Type A headers permit large propagation delay spreads between BXs during sector acquisition, which support BXs with a wide range of relative distances to the NX. Type B headers assume such delay spread to be a fraction of a symbol time, and instead provide insight regarding which BX is providing the dominant signal.

The synchronization field 404 enables the NX to synchronize its receiver and decoder to forward frames and symbols, and also helps the NX determine the frequency offset between the frequency of its oscillator (FIG. 3, 314) and that of the BX oscillator (FIG. 2, 205). It also determines the type of header, A or B.

For example, the synchronization field identifying a type A header comprises the following 48 symbols, numbered 0 through 47, as follows: 0, 0, 0, 0, 0, 0, 0, 0, 0, +3, +3, +3, +3, +3, −3, −3, +3, +3, −3, +3, −3, +3, 0, 0, 0, 0, +3, −3, +3, −3, +3, +3, −3, −3, +3, +3, +3, +3, +3, 0, 0, 0, 0, +3, −1, +1, −3.

These 48 symbols include 10 zero symbols, a 13 symbol Barker code, 4 zero symbols, a reversed 13 symbol Barker code, 4 zero symbols, and a final pattern +3, −1, +1, −3. Symbols 0 through 5 allow the root raised cosine filter in the NX receiver to synchronize to the root raised cosine filter in the BX transmitter, which is necessary in cases where the NX receiver was turned off or tuned to another channel during the previous forward frame. Symbols 6 through 26, comprising a Barker code preceded by four zero symbols and followed by four zero symbols, enable the NX receiver to efficiently achieve symbol synchronization to the forward frame and determine any frequency error between it and the BX transmitter. Symbols through 23 through 43, comprising a reversed Barker code preceded by four zero symbols and followed by four zero symbols, provides a second opportunity for the NX receiver to achieve symbol synchronization and determine any frequency error between it and the BX transmitter. Symbols 44 through 47 provide a final confirmation pattern the NX receiver can use to confirm forward frame synchronization.

The synchronization field identifying a Type B header is the inverse of the synchronization field identifying a Type A header, such that each symbol in one header type equals the corresponding symbol in the other header type multiplied by −1, as follows: 0, 0, 0, 0, 0, 0, 0, 0, 0, 0, −3, −3, −3, −3, −3, +3, +3, −3, −3, +3, −3, +3, −3, 0, 0, 0, 0, −3, +3, −3, +3, −3, −3, +3, +3, −3, −3, −3, −3, −3, 0, 0, 0, 0, −3, +1, −1, +3.

The sector information field 405 includes a high-level description of the sector, including its sector identifier, system identifier, sector configuration nonce, connection nonce, and a schedule of forward frames containing sector configuration information. In the case of Type A headers, field 406 contains a second, shorter synchronization pattern of 5 zero symbols followed by a 3 symbol Barker code, intended for resynchronization. In the case of Type B headers, field 406 contains a BX identifier plus parity. The frame information field 407 includes a description of the frame, including a frame identifier, GPS time information, and information regarding the data field. Type A headers allow the NX to receive and decode the sector information field 405 on one channel, then resynchronize to another channel and receive and decode a frame information field 407. Type B headers inform the node regarding which BX is providing its dominant signal.

The forward frame data field 403 contains 134 codewords, each codeword comprising a (63, 39) BCH codeword plus an odd parity bit. The forward frame data field is divided in two ways. First, the data field is divided into two separate, interleaved blocks, block 0 (408) containing 32 codewords, and block 1 (409) containing 102 codewords. Second, the data field is divided into four logical fields, including the address field 410, the sector configuration field 411, the packet field 412, and the fragment field 413. Any or all fields 410 through 413 may be empty and contain no data. The address subfield contains a list of MAC addresses, along with an index into the packet field. The configuration field contains information describing the sector configuration. The packet field contains forward packet data, and the fragment field contains datagram fragments. The length of the address and configuration fields are described in the frame header, while the length of the packet and fragment fields are implied. The division into two interleaved blocks (block 0, 408 and block 1, 409) allows NXs to stop receiving and decoding a frame early in some cases, thus conserving energy. For instance, after decoding block 0, if the NX determines the frame contains no packets addressed to it, it may power down its receiver and skip block 1. In some frames, block 0 or block 1 may be empty of useful information; in this case, the control stack may elect to not transmit block 0 or block 1 during these frames. However, the control stack does transmit the frame header for all frames.

While attempting to connect to a sector, NX configuration and sector configuration together determine a set of static forward frames the NX must attempt to receive and decode. Once connected, the control stack assigns a node availability value ("na") to the NX, which algorithmically modifies the set of static frames the NX must attempt to receive and decode. Because forward frames are synchronized to GPS, the control stack (FIG. 1, 101) is able to convey an estimated delivery time for forward datagrams sent by application servers (FIG. 1, 102) through the API (FIG. 1, 106). A control stack may also dynamically direct a connected NX to override the static frame set, requiring the NX to receive and decode additional forward frames or otherwise modifying the set of static forward frames.

Like forward frames, reverse frames occur once every 0.9375 seconds, each having a reverse frame identifier 0 through 3,839. Reverse frames are globally identified in dot-decimal notation using the system identifier, followed by the sector identifier, followed by the reverse channel identifier, followed by the reverse frame identifier. Each reverse frame contains 4,452 symbols, organized into 53 slots, each slot spanning 84 symbol times. The first symbol of a reverse frame is coincident with the first symbol of the sector information field of its corresponding forward frame. Reverse channels are multiplexed between NXs on a slot basis using a combination of ALOHA random access and scheduling by the control stack.

OSI Layer 3

The basic layer 3 unit of communication between NXs and their control stacks is the packet. Packets include forward packets, sent by the control stack to a primary or multicast MAC address, and reverse packets sent by a NX to the control stack. Both packet types pass logically between the control stack and NXs, with BXs timing and modulating radio frequency signals from IP data. Each NX is assigned one unique primary MAC address and up to 16 multicast MAC addresses. A control stack and its associated BXs have no address and are the implied destination of every reverse packet.

Forward packets are embedded into the forward frame structure. If present, the forward frame address field (FIG. 4, 410) contains address codewords that each specify a primary or multicast MAC address, along with an index into the packet subfield. Packets containing forward datagram fragments include an additional index into the fragment subfield of the current forward frame or a future forward frame. Together, the address codeword plus packet codewords comprise a packet addressed to a single NX, or to a group of NXs sharing a common multicast MAC address. NXs must decode frames to determine if they include a packet addressed to the NX. In cases where the NX conserves power by decoding a subset of frames, the control stack must take steps to embed packets in frames that will be decoded by the recipient NX or group of NXs.

Reverse packets are constructed by the NX and timed to overlay a single slot or a group of adjacent slots. Each reverse packet begins with the 12-symbol reverse packet header. The reverse packet header includes two zero symbols transmitted at low power (less than −13 dBm), followed by two zero symbols of ramp-up to full power. The final 8 symbols of the reverse packet header (3 zero symbols and a five-symbol barker code) are transmitted at full power along with the rest of the packet. Following the header, reverse packets consist of packet data coded into 12-symbol codewords based on the extended binary Golay code. The NX interleaves the coded packet symbols in a by 12 fashion and transmits them after the reverse packet header. Reverse response packets are scheduled by information in the forward request packets, while reverse request packets are scheduled using slotted ALOHA random access.

Figure 5:
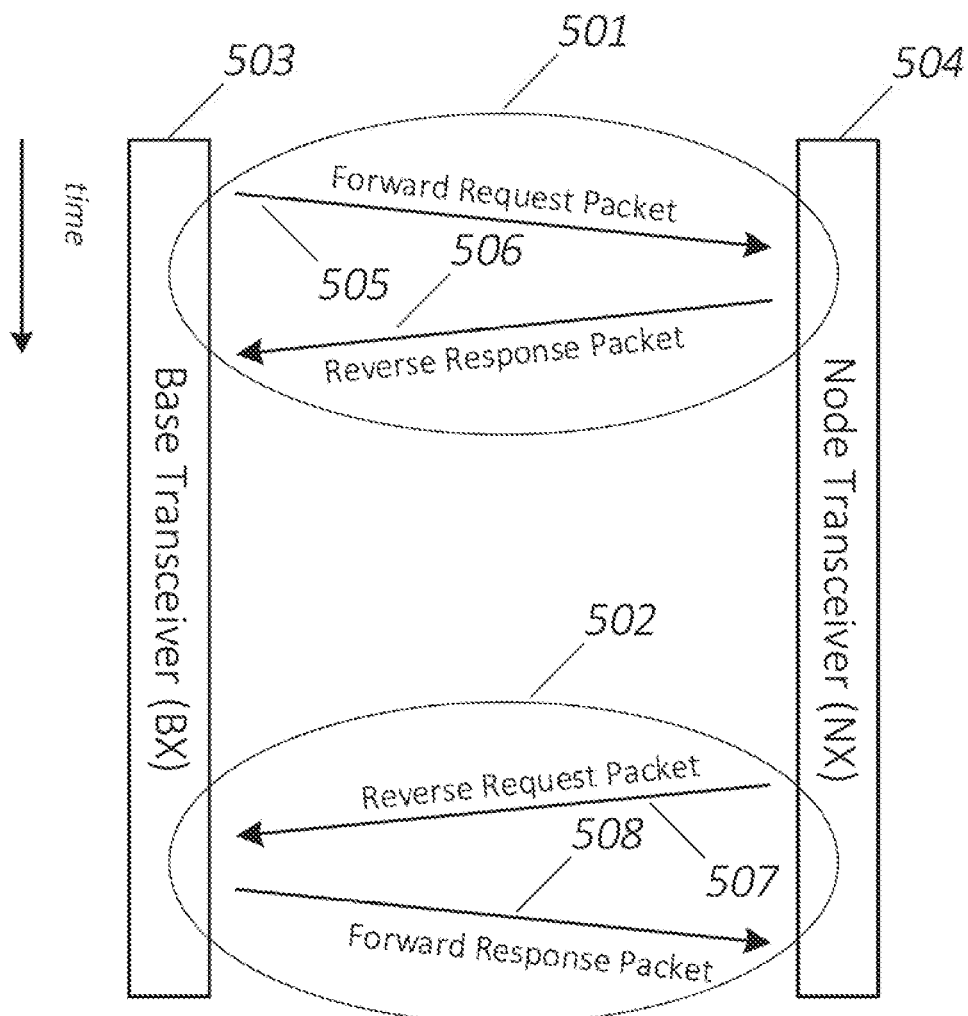
FIG. 5 is a diagram of forward and reverse packet transactions in accordance with an illustrative embodiment.

With reference to FIG. 5, example embodiments of a forward packet transaction 501 and a reverse packet transaction 502 are shown between a BX 503 and a NX 504. A forward packet transaction 501 begins with a forward request packet 505 transmitted by the BX 503 and received by the NX 504. The forward packet transaction completes with a reverse response packet transmitted by the NX 504 and received by the BX 503. A reverse packet transaction 502 begins with a forward request packet 507 transmitted by the NX 504 and received by the BX 503. The reverse packet transaction ends with a reverse response packet 508 transmitted by the BX 503 and received by the NX 504. Note that some packet transactions (for instance, forward datagram fragments sent to multicast MAC addresses) may not include a response packet. In this case the packet transaction effectively ends with transmission of the request packet.

Reverse packet transactions include a 5-bit packet sequence number ("psn"). The psn and the MAC address serve to associate forward response packets to reverse request packets. Forward packet transactions do not include a psn. Instead, forward request packets include information used by the NX to schedule the reverse response packet, which implicitly associates reverse response packets to their forward request packet counterparts.

OSI Layer 4

The basic layer 4 message unit of the illustrative embodiment wireless network system is the datagram. Datagrams include forward datagrams, sent to node primary or multicast addresses, and reverse datagrams, sent from nodes. Datagrams are divided into system datagrams, sent between NXs and control stacks, and user datagrams, sent between application servers and NCs.

Figure 6:
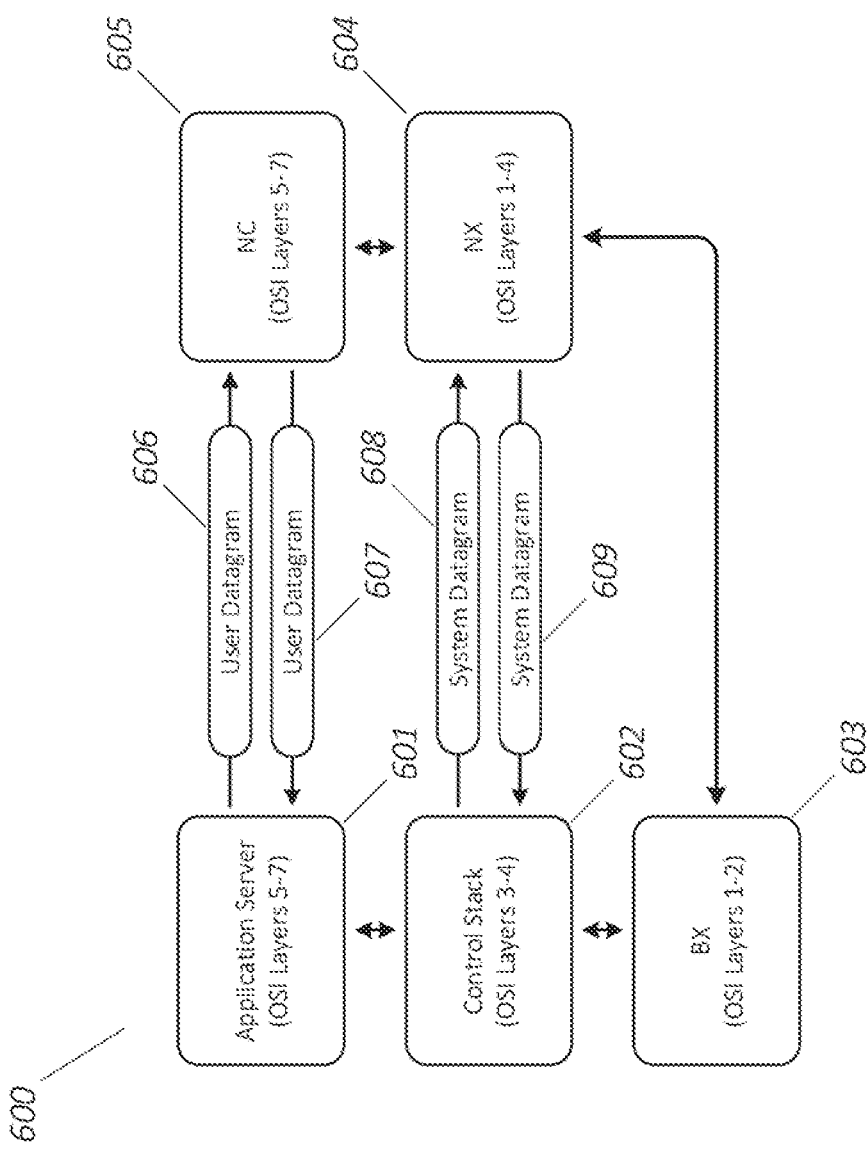
FIG. 6 is a diagram of forward and reverse datagram flow in accordance with an illustrative embodiment.

With reference to FIG. 6, 600 depicts the illustrative embodiment of the wireless network system (FIG. 1, 100) in a simpler form. Conceptually, an application server 601 exchanges user datagrams with an NC 603, including a forward user datagram 606 and a reverse user datagram 607. In this way, the application server 601 communicates with its nodes to create the desired top-level application. Likewise, conceptually, a control stack 602 exchanges system datagrams with an NX 604, including a forward system datagram 608 and a reverse system datagram 609. In this way, the control stack 602 is able to configure and manage the NX 604.

Overall, considering the illustrative embodiment 600 as a whole, the BX 603 provides OSI layers 1-2, the control 602 stack provides OSI layers 3-4, and the application server 601 provides OSI layers 5-7. Likewise, the NX 604 provides OSI layers 1-4, and the NC 605 provides OSI layers 5-7.

Node Configuration Management

TABLE 2

| Attribute | Description |
| --- | --- |
| paddr | The primary NX MAC address |
| key | The primary NX private encryption key |
| hsystem | The identification of the node's home control stack |
| freq | A list of frequencies to be scanned during sector acquisition |
| system | A list of control stacks to be considered during sector acquisition |
| maddr | A list of multicast MAC addresses |
| mname | A list of symbolic names, each corresponding to a multicast address |
| mkey | A list of private encryption keys, each corresponding to a multicast address |

With reference to Table 2, the illustrated embodiment requires a set of configuration attributes shared between each NX and the NX's home network. These attributes are stored in a configuration file in NX nonvolatile memory, and they are also stored in the control stack's home location register. For a roaming node, a subset of this information is stored in the visited location register in the visited network's control stack. The paddr attribute represents the NX's primary MAC address. The key attribute represents the shared private encryption key used to encrypt and decrypt forward datagrams sent to the NX's primary MAC address as well as reverse datagrams sent by the NX. The hsystem attribute represents the system identifier of the NX's home network. The freq attribute contains a list of frequencies that the NX may use during sector acquisition. Together, the frequencies included in the freq attribute, plus the frequencies included in lfreq (Table 20), constitute the starting point for candidate channel list construction. The system attribute contains a list of system identifiers to which the NX is permitted to connect. The maddr attribute contains a list of multicast MAC address for the NX. The mname attribute includes a list of symbolic names, one corresponding to each multicast MAC address, each serving to give a symbolic name to the multicast group. Likewise, the mkey attribute includes a corresponding list of shared private encryption keys, one corresponding to each MAC address, used to encrypt and decrypt datagrams sent to the corresponding MAC address. Each NX's configuration file is managed by its home network control stack, which uses system datagrams to synchronize the NX configuration file with the NX's home location row.

Node Mobility Management

In the illustrative embodiment, each NX conceptually belongs to one wireless network system, called its home system, with which it may send and receive datagrams. Prior to sending and receiving datagrams, an NX must explicitly connect to a sector using a sector connection packet transaction. This process of detecting and connecting to a sector is called sector acquisition. Sector acquisition includes three steps, candidate channel list construction, candidate sector list construction, and sector connection. Each of the three steps is handled somewhat differently depending on whether the NX is in a connected state or a disconnected state at the time of the sector acquisition process.

Each NX maintains several data structures related to sector acquisition, including a candidate channel list, a candidate sector list, an observed sector table, and a channel lockout table. The candidate channel list is a volatile list of frequencies, each item representing a single channel. The candidate sector list is a volatile list of sectors, each item representing a single sector and including a system identifier, a sector identifier, a sector configuration nonce, and the frequency of the forward channel on which the sector was detected. The nonvolatile channel lockout table contains rows with a channel frequency and a timeout value, each row describing a channel which should be ignored during sector acquisition. The timeout column is monitored by NX firmware, such that when a row times out, it is deleted from the lockout table. Finally, the nonvolatile observed sector table describes details of sectors that the NX has encountered. Each observed sector table row includes a system identifier and a sector identifier, together acting as a primary key, plus a sector configuration nonce and sector configuration details.

Sector Acquisition for Disconnected NX

During the candidate channel list construction step of sector acquisition, a disconnected NX builds a preliminary candidate channel list using the channel frequencies included in the freq configuration attribute (Table 2) plus the frequencies included in the lfreq value of its Node Configuration Register (Table 20). The NX then deletes all items from the preliminary candidate channel list that have a matching record in the lockout table. The disconnected NX then scans the remaining entries in its preliminary candidate channel list, tuning its receiver to each frequency in the list for a brief period and recording the received signal strength. The NX repeats this scanning process, cycling through all frequencies in the preliminary candidate channel list several times, for an interval long enough that each frequency would have been measured at least once during a forward frame header period. During this process, the NX notes the maximum signal strength observed for each channel in the preliminary candidate channel list. Each channel that fails to meet a signal threshold minimum is removed from the channel candidate list. Once this process is complete, the remaining channel entries become the candidate channel list and candidate channel list construction is complete. If the resulting candidate channel list is empty, then the disconnected NX terminates the acquisition process.

Once the candidate channel list is complete, each item in the list describes a channel which may be a control channel of a sector. The disconnected NX performs the candidate sector list construction, starting with an empty sector candidate list and executing a candidate sector evaluation 700 for each frequency in the candidate frequency list.

Figure 7:
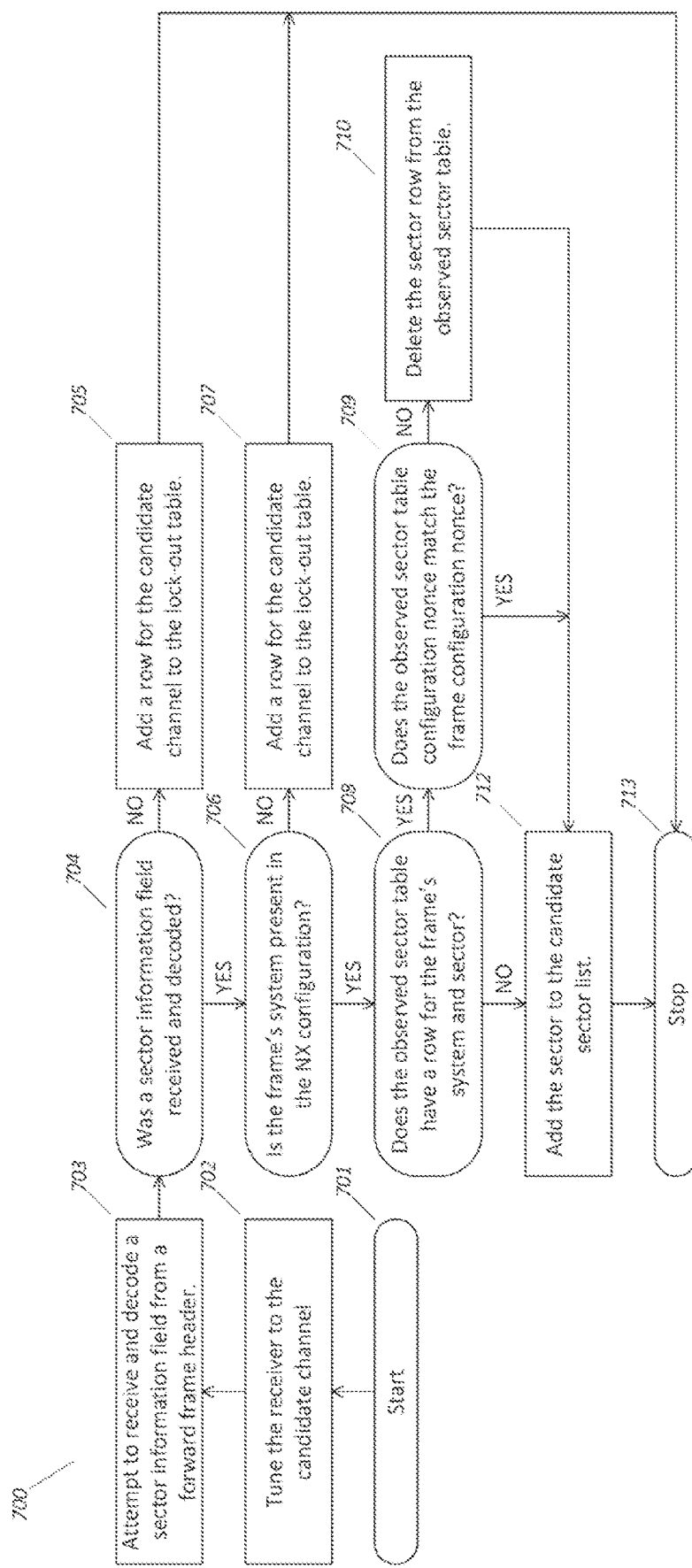
FIG. 7 is a flow chart describing a candidate sector evaluation process in accordance with an illustrative embodiment.

With reference to FIG. 7, a flowchart depicts a candidate sector evaluation 700 in accordance with an illustrative embodiment, beginning with 701. The NX first tunes its receiver to the candidate channel frequency 702, then attempts to receive and decode a sector information field 703. If the NX is unable to receive and decode a sector information field, then the NX creates a row in the channel lockout table matching the candidate channel frequency 705 and completes the candidate sector evaluation 713. If the NX successfully receives and decodes a sector information field, then the NX examines the system identifier 707. If the system identifier is not present in the system configuration attribute (Table 2), then the NX creates a row in the channel lockout table matching the candidate channel frequency 707 and completes the candidate sector evaluation 713. Steps 705 and 707 may result in different timeout values for the created lockout table row. If the system identifier decoded in step 703 is present in the system configuration attribute (Table 2), then the NX examines its observed sector table 708. If the frame sector has no entry in the observed sector table, then the NX adds the sector to the candidate sector list 712 and completes the candidate sector evaluation 713. If the frame's sector has an entry in the observed sector table, then the NX compares the sector configuration nonce decoded in step 703 to the configuration nonce in the observed sector table row 709. If the two configuration nonce values do not match, then the NX deletes the sector from the observed sector table 710. The NX then adds the sector to the candidate sector list 712 and finishes the candidate sector evaluation 713. If the nonce values do match, then the NX adds the sector to the candidate sector list 712 and finishes the candidate sector evaluation 713. When the candidate channel evaluation has completed for each channel in the channel candidate list, the candidate sector list construction is complete. If the candidate sector list is empty, then the NX terminates the sector acquisition process. Otherwise, the NX uses signal strength measurements, system priority values, sector priority values, and other criteria as necessary to order the items in candidate sector list by relative priority.

Once the candidate sector list is complete and ordered by priority, the NX attempts to connect to sectors in the candidate sector list, one at a time, starting with the highest priority sector and continuing through the list until a connection is successful, or until the candidate sector is exhausted.

Figure 8:
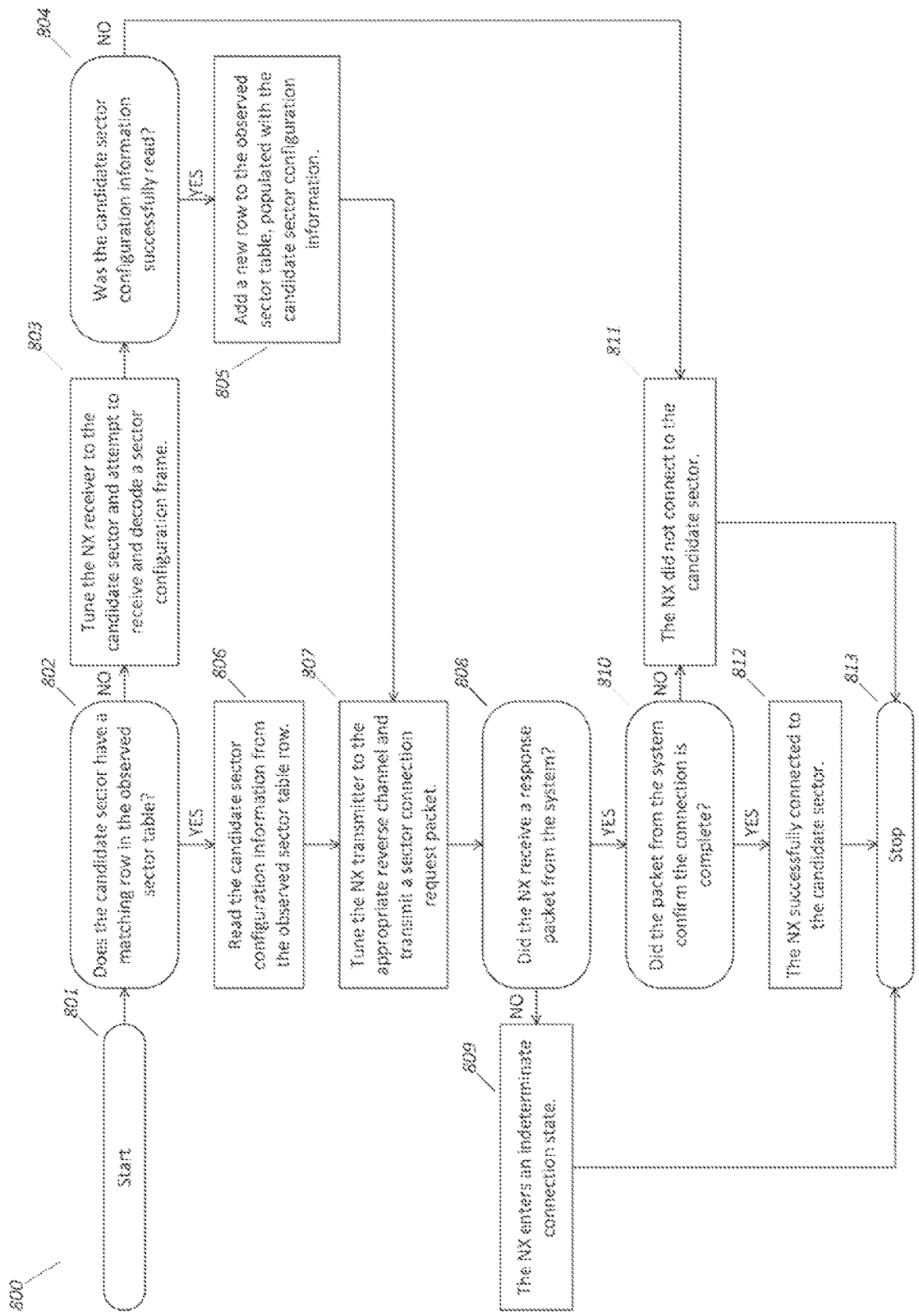
FIG. 8 is a flow chart describing the candidate sector connection process in accordance with an illustrative embodiment.

With reference to FIG. 8, a flowchart depicts a candidate sector connection attempt 800 in accordance with an illustrative embodiment, beginning with 801. The NX first attempts to find a row in its observed sector table matching the candidate sector 802. If this is not found, then the NX tunes to the sector channel and attempts to read the sector configuration 803. If the NX is able to successfully receive and decode the candidate sector's configuration information 804, then it creates a row in the observed sector table 805, and transmits a connection request packet 807. If the NX is unable to successfully receive and decode the candidate sector's configuration information 804, then it does not successfully connect to the candidate sector 811 and the sector connection attempts ends 813. After the NX transmits a connection request packet 807, it waits for a response 808. If it does not receive a packet response, then the NX enters an indeterminate connection state and the sector connection attempt ends 813. If the NX does receive a response, it examines that response for success 810. If the response indicates success, then the NX is connected to the candidate sector 812 and the connection attempt ends 813. If the response indicates failure, then the NX has not connected to the sector 811 and the connection attempt ends 813. At the end of each connection attempt, if the NX is not successfully connected, it repeats the process with the next candidate sector in the ordered candidate sector list. Once the list is complete, or the NX is connected, then the sector acquisition is complete.

Sector Acquisition by Connected NX

Connected NXs perform the sector acquisition process in a manner similar to unconnected NXs, but while remaining connected to their present sector. During sector acquisition, if a connected sector determines that the highest priority candidate sector is the sector to which it's presently connected, then the process ends with no sector connection step, and the NX remains connected to its sector. For a connected NX operating with a zero na value, requiring it to receive and decode each forward frame header, three additional changes are made to the process. First, during candidate channel list construction, a connected NX measures signal strength of candidate channels list during the sector information field of forward frame headers. During this process, the connected NX synchronizes to a frame synchronization field in its sector, then scans candidate channels during the sector information field, then retunes its receiver to its sector control channel to receive the frame information field and data field. Second, during candidate sector evaluation, the connected NX synchronizes to the candidate channel, receives and decodes the synchronization and sector information field, then returns to its sector channel to receive the frame information and data fields. Third, the connected NX must balance sector connection attempts with data transmission and reception activity on its currently connected sector. Finally, during a sector connection attempt, if the attempt fails (FIG. 8 811), the NX remains connected to its current connected sector or enters an indeterminate connection state.

Sector Acquisition Examples

Figure 9A:
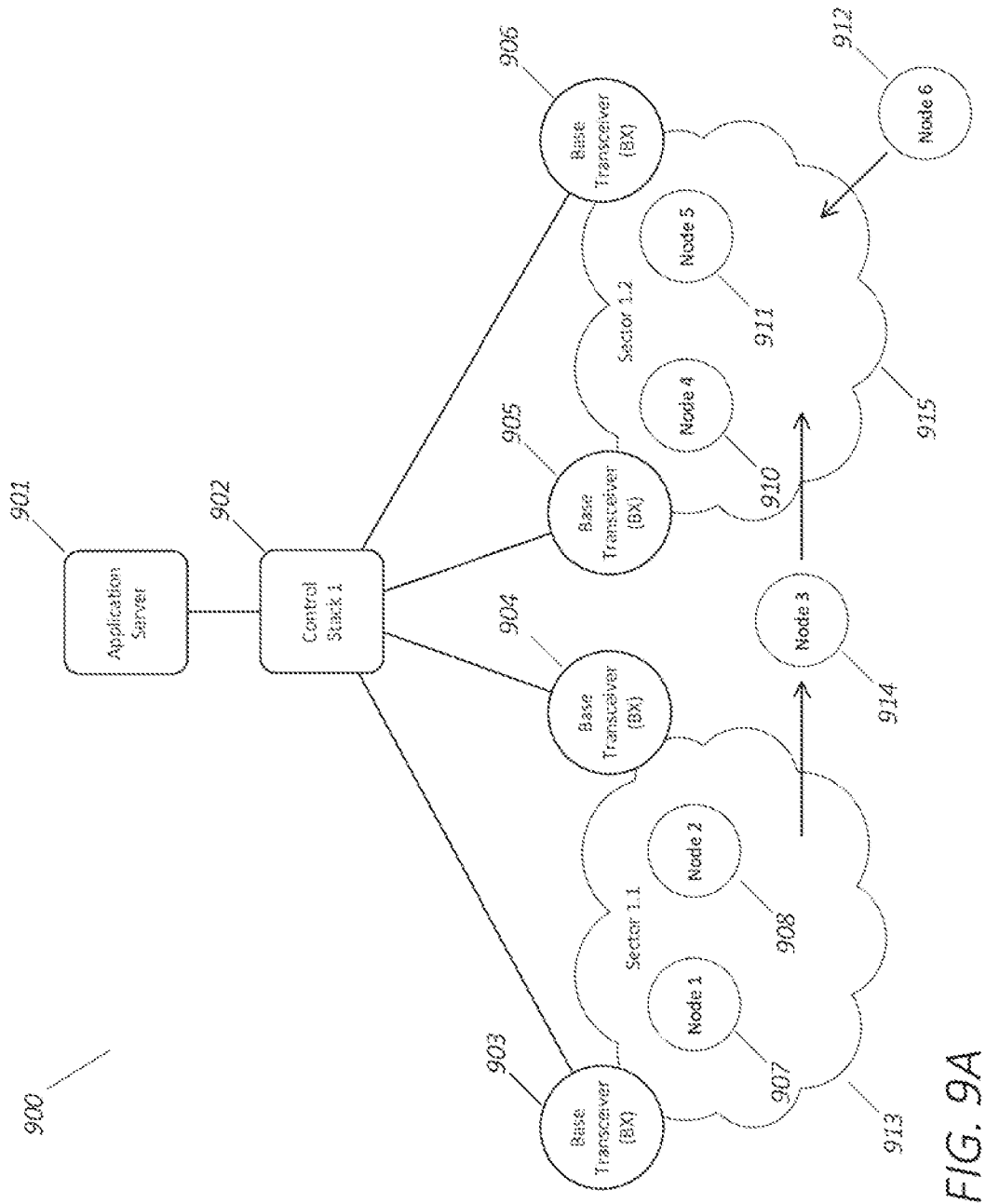
FIGS. 9A and 9B are diagrams of the sector acquisition process in accordance with an illustrative embodiment.

With reference to FIG. 9A, an example embodiment of a wireless network 900 is shown, including a control stack 902, an application server 901, and four BXs 903, 904, 905, 906. The wireless network operates two sectors of coverage, sector 1.1 913 served by two BXs 903, 904, and sector 1.2 913, served by two BXs 905 and 906. Node 1 907 and Node 2 908 are connected to sector 1.1, while node 4 910 and node 5 911 are connected to sector 1.2. Node 6 912, shown presently disconnected but executing a sector acquisition process, has already completed candidate channel list construction and candidate sector list construction and has initiated a connection request with the BXs in sector 1.2 913. If this transaction completes successfully, node 3 will become connected to sector 1.2 913; otherwise it will remain in a disconnected state.

Also with reference to FIG. 9A, node 3 914 is shown connected to sector 1.1 913, and also in the sector acquisition process. Node 3 914 has already completed candidate channel list construction and candidate sector list construction, and has initiated a connection request with sector 1.2 915. If this transaction completes successfully, node 3 914 will become connected to sector 1.2 915; otherwise it will enter an indeterminate connection state or remain connected to sector 1.1 913.

The sector acquisition process also allows for roaming between systems, wherein a node connects to a sector of a system that is not the NX's home system, called the visited system. In this case, the visited system's control stack exchanges packets with the NX, but tunnels datagrams and other high-level transactions to the NX's home system. From the point of view of the NX, the sector acquisition is identical whether it involves one system or multiple systems. However, control stacks must be interconnected and properly configured.

Figure 9B:
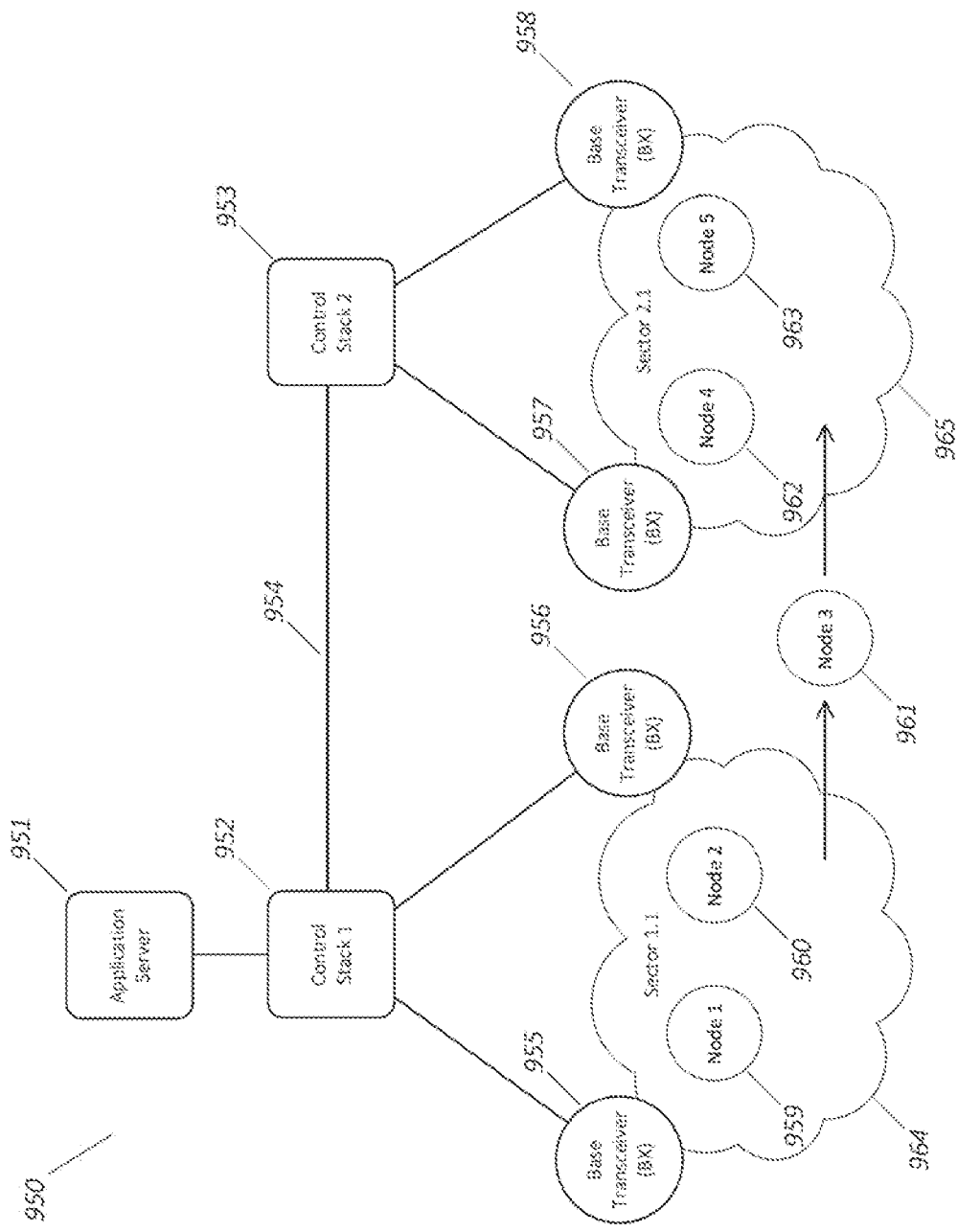

With reference to FIG. 9B, an example embodiment of two wireless networks are shown. Network 1 comprises control stack 1 952, two BXs 955 and 956, and sector 1.1 964. Network 2 comprises control stack 2 953, two BXs 957 and 958, and sector 2.1 965. Network 1 is the home network for node 1 959 and node 2 960, which are both connected to sector 1.1 964. Network 2 is the home network for nodes 4 962 and node 5 963, which are connected to sector 2.1 965. An intersystem roaming link 954 is shown connecting control stack 1 952 to control stack 2 953. Network 1 is the home network for node 3 961, which is shown connected to sector 1.1 964, but executing a sector acquisition process to connect to sector 2.1 965. Having already completed candidate channel list construction and candidate sector list construction, node 3 961 initiates a connection request with sector 2.1 965. Control stack 2 953 proxies the connection request from node 3 965 to control stack 1 952, and control stack 1 952 assists control stack 2 953 in establishing a visited location register row. If the connection transaction completes successfully, node 3 961 will become connected to sector 2.1 965. If node 3 961 successfully connects to sector 2.1, control stack 2 953 will begin proxying datagrams between the node 3 961 and control stack 1 952 in a manner largely transparent to node 3 961.

Use of BX Location Information

A node that has access to its own location as well as BX locations can adjust the lfreq parameter (Table 20) dynamically, according to local conditions, to optimize sector acquisition. A carrier may publish a map of relevant BXs, including a latitude, longitude, frequency, and transmission radius of each site. This map may be replicated to nodes using various methods (eg, updated through the Internet while charging, broadcast as a multicast datagram, etc). Location-aware nodes then dynamically build the lfreq channel list depending node location and BX locations.

NX Interface (NXI)

NXI provides a dedicated connection between an NC and an NX. The NC communicates with the NX through a 7-wire interface, which includes handshake lines to establish a session, and an I2C-based link for reading and writing multi-byte registers to perform various functions.

Electrical Interface

TABLE 3

| Signal | Description |
| --- | --- |
| SDA | I2C data line |
| SCL | I2C clock line |
| /RESET | An active-low reset line, driven by the NC to the NX |
| ATTN | An active-high attention/interrupt line, driven by the NX to the NC |
| CREQ | An interface connection request, driven by the NC to the NX |
| CACK | An interface connection acknowledgement, driven by the NX to the NC |
| TMARK | A time pulse, driven by the NX to the NC |

Figure 10A:
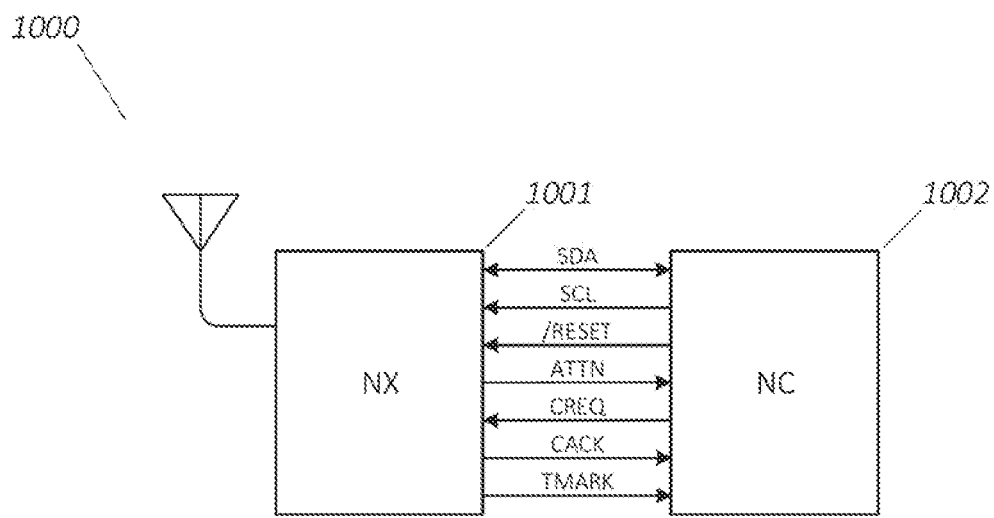
FIGS. 10A and 10B are diagrams of the Node Transceiver Interface (NXI) in accordance with an illustrative embodiment.

With reference to Table 3, the electrical connections between a NC and NX within the illustrated embodiment are shown. The SDA and SCL lines form an I2C connection between the NC and NX. In this arrangement, the NC is the I2C master and the NX is the slave, whereby the NC may read and write software registers within the NX. The NC drives the/RESET line low to reset the NX. The NX drives the ATTN line high notify the NC that it has event data pending. For example, the NX would raise the ATTN line to signal reception of a forward datagram. The NC drives the CREQ line high to request I2C communications with the NX, and the NX drives the CACK line high to indicate its I2C interface is ready for use. The NX delivers a pulse on the TMARK line at the center of the $212^{th}$ symbol of the currently received forward channel frame; the NC can use this signal edge to establish an accurate timebase as needed. With reference to FIG. 10A, an example embodiment of the physical NXI connection is shown 1000. The NC 1002 connects to the NX 1001 using the 7 lines described in Table 1.

NXI assumes the NX and NC to be low power devices that remain in relatively inactive sleep states for as long as possible to minimize energy consumption. NXI includes a communications handshake based on the CREQ and CACK lines, allowing the NC and NX to remain in low-power state until one is needed by the other. When the NC wishes to communicate with the NX, it raises the CREQ line. The NX then prepares its I2C interfaces, and when ready, acknowledges by raising the CACK line. Thus, when CREQ and CACK are both high, the NC may initiate I2C transactions.

Figure 10B:
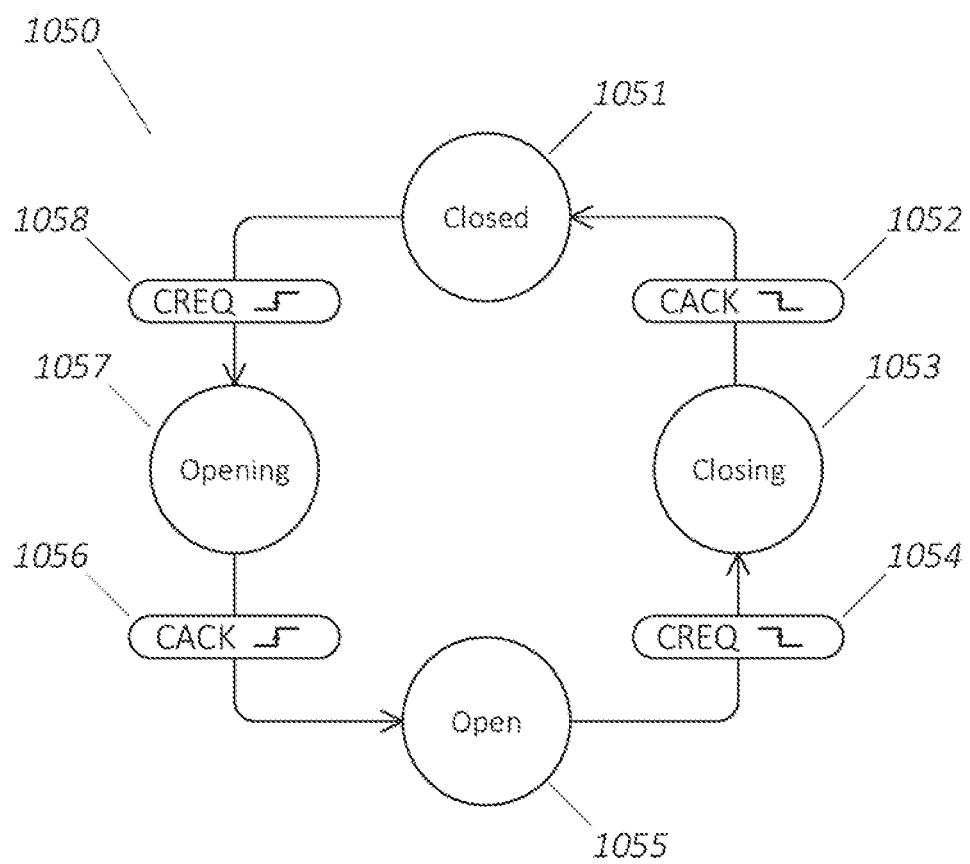

With reference to FIG. 10B, the state machine 1050 concerning a CREQ/CACK handshake in accordance with the illustrative embodiment is shown. The state machine includes four possible states: Closed 1051, Opening 1057, Open 1055, and Closing 1053, which are traversed by loosely coupled actions of the NC and NX. After /NRESET is raised, the initial state is Closed 1051. While in the Closed state, the NC and NX are logically disconnected, the SDA and SCL lines are pulled low, and I2C communications are not possible. When the NC wishes to communicate, it raises the CREQ line 1058, entering the Opening state 1057. During the Opening state 1057, the NX adjusts its power state as necessary and initializes its I2C hardware and software interface. During the Opening state 1057, the SDA and SCL lines are pulled low and I2C communications are not possible. When the NX has activated its I2C interface and is ready to communicate, it raises its CACK line 1056, entering the Open state 1055. During the Open state 1055, the SDA and SCL lines are enabled and the NC may initiate I2C transactions. Once the NC is finished communicating, it lowers the CREQ line 1054, putting the interface into the Closing state 1053. During the Closing state 1053, the SDA and SCL lines are pulled low and communication is not possible. When the NX is finished closing its interface, it lowers the CACK 1052 line, returning to the initial Closed state 1051.

Logical Interface

Once in the Open state, the NC may initiate I2C transactions, which are combination transactions involving a write of an operation frame followed by optional data, followed by a read of a status byte followed by optional data. The I2C serialization format includes typed binary fields representing integers, ASCII characters, binary BLOB's, and a multiple-field register information type.

TABLE 4

| Type | Definition |
| --- | --- |
| u8 | 8-bit unsigned value |
| u16 | 16-bit unsigned value |
| u32 | 32-bit unsigned value |
| i8 | 8-bit signed value |
| i16 | 16-bit signed value |
| i32 | 32-bit signed value |

With reference to Table 4, the numerical NXI types are listed for the illustrative embodiment. The u8, u16, and u32 types represent 1-, 2-, and 4-byte unsigned integers, while the i8, i16, and i32 types represent 1-, 2-, and 4-byte signed integers. Numeric values are serialized in little endian order (least significant byte first).

In addition to the numeric types, the character type (char) occupies one byte and contains an ASCII character value, while a string type is implied as a char array field[n] where n specifies the total number of characters allocated to the string. In a string field, unused character positions are zero filled. The blob value contains a sequence of bytes. Blob types can be 0 or more bytes long and contain no length or allocation information. A blob length is inferred from the register size containing the value.

The register information type reginfo describes an NX software register. A Read operation from the Directory register returns a list of these structures describing all available NXI registers. A Read Info operation of a register returns a single structure describing the register.

TABLE 5

| Name | Type | Definition |
| --- | --- | --- |
| id | u8 | Register ID |
| flags | u8 | Register Flags |
| blocksize | u16 | Block size in bytes |
| version | u32 | Data Version |
| size | u32 | Total register size in bytes |

With reference to Table 5, the fields of the reginfo type, as used in the illustrative embodiment, are described. The id field contains the register identifier. The flags field contains several 1-bit flags describing attributes of the register. The blocksize field specifies the block size of the underlying file. If blocksize is not zero, write operations must contain data to exactly match an even number of blocks, and must begin on an even block boundary. The version field is the current version of the register data. The version field is set to 0 for registers without a version number. The size field contains the size of the register in bytes.

TABLE 6

| Bit | Name | Description |
| --- | --- | --- |
| 0 | Read | Register is readable |
| 1 | Write | Register is writeable |
| 2 | Valid | Register has been validated and contains valid data |
| 3 | Random | Register supports random access (nonzero size and offset) |
| 4 | Execute | Register contains an executable image file |
| 5-7 | Reserved | Reserved for Future Use |

With reference to Table 6, individual bits of the flags field are defined within the illustrative embodiment. The read and write flags indicate whether Read and Write operations are permitted on the register, respectively. The valid flag indicates that the register has been validated and contains meaningful data. The random flag indicates whether read and write operations may use a non-zero offset value in the operation frame for random access of the register data, and the execute flag indicates that the file contains an executable firmware image. The valid, random, and execute flags are primarily intended for file-like registers such as firmware or logs, may be used for other vendor-specific registers.

TABLE 7

| Field | Type | Description |
| --- | --- | --- |
| opcode | u8 | Operation |
| id | u8 | Register ID |
| size | u16 | Number of bytes to read or write |
| offset | u32 | Byte offset |

With reference to Table 7, an I2C operation frame is described in accordance with an illustrative embodiment. The opcode field specifies the operation, and the id field specifies the register to be accessed. The size field specifies the number of bytes of data to read or write, and the offset field specifies the byte offset in the register to start the read or write operation. To read the entire register, both the size and offset fields should be zero. For registers with a random flag of zero, the size and offset fields must be zero and the whole register must be read or written.

TABLE 8

| Value | Description |
| --- | --- |
| 0 | Read Info |
| 1 | Read |
| 2 | Write |
| 3 | Erase |
| 4 | Flush |
| 5 | Verify |
| 6-255 | Reserved |

With reference to Table 8, the possible values of the opcode field of the operation frame (Table 7) in accordance with an illustrative embodiment are summarized.

The Read Info operation returns information about a register. The operation requires a combined I2C transaction, a write of the operation frame followed by a read. The read returns a result code byte followed by a reginfo structure describing the register if the result code is zero, or a sequence of zeroes if the result code was not zero.

The Read operation reads the contents of a register. The operation requires a combined I2C transaction, a write of the operation frame followed by a read. The read returns a result code byte followed by either the contents of the register if the result code is zero, or a sequence of all ones if the result code was not zero.

The Write operation writes data to a register. The operation requires a combined I2C transaction, a write of the operation frame plus the data to be written to the register, followed by a read of the result code byte.

The Erase operation erases a register. This operation is typically used with long registers (e.g., firmware image) to erase a register implemented in Flash ROM before performing multiple write operations. The operation requires a combined I2C transaction, a write of the operation frame, followed by a read of the result code byte.

The Flush operation flushes pending writes to a register. This operation is typically used with long registers (for instance, a firmware image register) to ensure all writes are committed before proceeding. The operation requires a combined I2C transaction, a write of the operation frame, followed by a read of the result code byte.

The Verify operation checks the register for completeness and validity. This operation is typically used with long registers (for instance, a firmware image register) to ensure data has been written correctly. The operation requires a combined I2C transaction, a write of the operation frame, followed by a read of the result code byte.

TABLE 9

| Value | Description |
| --- | --- |
| 0x00 | Success |
| 0x80 | Unknown operation |
| 0x81 | Unknown register |
| 0x82 | Read/write past end of register |
| 0x83 | Block boundary violation |
| 0x84 | Unknown command |
| 0x85 | Command not supported |
| 0x86 | Bad command parameter |
| 0x87 | Register empty |
| 0x88 | Register not erased |
| 0x89 | General write failure |

With reference to Table 9, status code values are summarized. An NX contains several software registers, each with a byte length ranging from 4 bytes (Control Register) up to hundreds of kilobytes (Firmware Image Register). The NC may determine the length and other attributes of a register using the Read Info operation, and it may also read the Directory Register, which contains a sequence of reginfo structures describing all available registers in the NX.

TABLE 10

| Identifier | Description |
| --- | --- |
| 0xff | Interface State |
| 0xfe | Control |
| 0xfd | Directory |
| 0xfc | Transceiver State |
| 0xfb | Event |
| 0xfa | Command |
| 0xf9 | Hardware Information |
| 0xf8 | Network Configuration |
| 0xf7 | Node Configuration |
| 0xf6 | Time |
| 0x81-0xf5 | Reserved |
| 0x80 | Firmware Image |

TABLE 10-continued

| Identifier | Description |
| --- | --- |
| 0x40-0x7f | Reserved |
| 0x00-0x3f | Product/Vendor-Specific Registers |

With reference to Table 10, the NX software register identifiers in accordance with an illustrative embodiment are defined.

Interface State Register

The Interface State Register provides a snapshot of the NXI interface, including specific information about the Directory and Event registers.

TABLE 11

| Field | Type | Description |
| --- | --- | --- |
| compatibility | u16 | Compatibility ID |
| major | u8 | Major compatibility number (0x01) |
| minor | u8 | Minor compatibility number (0x01) |
| txq | u8 | Current transmit queue length |
| regcount | u8 | Number of registers referenced in the director register |
| eventsize | u16 | Size of next event in the Event FIFO register |

With reference to Table 11, the Interface State register in accordance with an illustrative embodiment is defined. The compatibility field contains the value 0xda80. The major and minor fields contain the NXI specification revision implemented by the interface. The txq field contains the current length of the transmit queue. The regcount field indicates the number of registers in the directory, and eventsize indicates the size of the next event pending in the Event Register.

Control Register

The Control Register allows the NC to perform low-level control operations on the NX.

TABLE 12

| Field | Type | Description |
| --- | --- | --- |
| flags | u32 | Flags |

With reference to Table 12, the NX Control register in accordance with an illustrative embodiment is defined. The control register contains one 32-bit field flags which is subdivided into several bitfields.

TABLE 13

| Bit | Name | Description |
| --- | --- | --- |
| 0 | enable | Enable transceiver |
| 1 | enablecfg | Enable Network Configuration Change event |
| 2 | enablepro | Enable Reverse Data gram Progress event |
| 3 | enablecon | Enable Connection State Change event |
| 4-7 | reserved | Reserved |
| 8-15 | enablemc | Enable Reset Network Configuration command |
| 16-30 | reserved | Reserved |
| 31 | reset | Soft reset |

With reference to Table 13, the bitfields of the NX Control register in accordance with an illustrative embodiment are defined. The enable field determines whether the NX is enabled to connect, send datagrams, and receive datagrams. If enable is set to 0, the NX becomes disabled at an RF level. If enable is set to 1, then the NX can operate normally. The enablecfg, enablepro, and enablecon fields enable the Network Configuration Change, Connection State Change, and Reverse Datagram Progress events, respectively. Then enablernc field enables the Reset Network Configuration command. Writing 0x55 in this field enables this command; writing anything else disables it. Writing a 1 to the reset field affects a software reset of the NX.

Directory Register

The Director Register contains a sequence of reginfo structures, each one describing a register. The Directory register thus serves as a directory of other registers, with the length depending on the total number of standard and vendor-specific registers implemented in the NX. The length can be determined by performing a Read Info operation on the Directory register itself, or by multiplying the regcount value of the Interface State register by 12 bytes.

Transceiver State Register

The Transceiver State Register provides access to details concerning the NX's connection state, synchronization state, and other state information.

TABLE 14

| Field | Type | Description |
| --- | --- | --- |
| cstate | u8 | Connection state |
| txq | u8 | Reverse Datagram Queue Length |
| sstate | u8 | Synchronization state |
| na | u8 | Node availability |
| bxid | u8 | Dominant Base Transceiver |
| sector | u8 | Current Sector |
| system | u16 | Current System ID |
| fchan[4] | u32 | Forward Channel Frequencies |
| rchan[4] | u32 | Reverse Channel Frequencies |
| ccindex | u8 | Control Channel Index |
| fcmask | u8 | Channel mask |
| ccss | I16 | Control Channel Signal Strength (dBm) |

TABLE 15

| Value | Description |
| --- | --- |
| 0 | Disconnected |
| 1 | Connecting |
| 2 | Connected |
| 3 | Disconnecting |
| 4 | Changing |
| 5 | Lost |
| 6 | Indeterminate |
| 7-255 | Reserved |

TABLE 16

| Value | Description |
| --- | --- |
| 0 | Asynchronous |
| 1 | Frame Synchronous |
| 2 | Symbol Synchronous |
| 3-255 | Reserved |

TABLE 17

| Bit | Name | Description |
| --- | --- | --- |
| 0 | ch0ctl | Channel 0 control indicator |
| 1 | ch1ctl | Channel 1 control indicator |
| 2 | ch2ctl | Channel 2 control indicator |
| 3 | ch3ctl | Channel 3 control indicator |
| 4 | ch0cfg | Channel 0 configuration indicator |
| 5 | ch1cfg | Channel 1 configuration indicator |
| 6 | ch2cfg | Channel 2 configuration indicator |
| 7 | ch3cfg | Channel 3 configuration indicator |

With reference to Table 14, the NX Transceiver State register in accordance with an illustrative embodiment is defined. The cstate field describes the NX's connection state, as defined in Table 15. The txq field contains the current reverse datagram queue length. If the cstate field is Disconnected, Disconnecting, or Changing, then the remaining fields are undefined. Otherwise, the sstate field contains the synchronization state of the NX, as per Table 16. The na field contains the node availability value. The bxid field contains the BX identifier most recently decoded in a forward frame header; a value of 0xFF indicates this information is not available. The sector and system fields contain the currently connected sector and system identifiers. The fchan and rchan fields contain the frequencies of the forward and reverse channels used in the sector (unused channels are set to zero). The ccindex identifies the control channel used by the NX, and fcmask contains several bitfields describing each forward channel as per Table 17.

Event Register

The Event Register exposes the head of the NX event FIFO. Each Read operation on this register returns the next sequential event. The NC can determine the byte length of the next event prior to reading the Event register by performing a Read Info operation on the Event register, or by examining eventsize field of the Interface State register.

Command Register

The NC issues commands by writing commands to the Command register using Write operations. Each write to the Command register constitutes a separate command.

Hardware Information Register

The Hardware Information Register exposes manufacturing information and capabilities.

TABLE 18

| Field | Type | Description |
| --- | --- | --- |
| regcount | u8 | Register Count |
| txqmax | u8 | Maximum Transmit Queue Length |
| revmaj | u8 | Firmware Major Revision Number |
| revmin | u8 | Firmware Minor Revision Number |
| build | u16 | Firmware Build Number |
| maxpow | u8 | Maximum transmit power |
| r | u8 | Reserved |
| man[32] | char | Manufacturer String |
| model[32] | char | Product Model |
| hwver[32] | char | Hardware Version String |
| swver[32] | char | Firmware Version String |
| esn[16] | char | Electronic Serial Number |
| uid[16] | Char | Manufacturer UID |

Network Configuration Register

The read-only Network Configuration Register contains the current NX network-side configuration. This information is programmed over the air by the NX's home network.

TABLE 19

| Field | Type | Description |
| --- | --- | --- |
| Paddr | u32 | Primary Address |
| hsystem | u16 | Home System ID |
| reserved | u16 | Reserved |
| maddr[16] | u32 | Multicast Address List |
| mname[512] | Char | Multicast Address Name List |
| system[16] | u16 | Allowed System List |
| priority[16] | u8 | System Priorities |
| freq[16] | u32 | Scan List |

With reference to Table 19, the Hardware Information register in accordance with an illustrative embodiment is defined. The paddr and hsystem fields contain the NX primary address and home system, respectively. The maddr field contains the NX multicast addresses list, which can have as many as 16 addresses. Zeros fill unused address positions. Likewise, the mname field contains a 32-character name for each address, zero padded to 32 characters. The system and priority fields contain the list of allowed systems with which the NX may connect, and the priorities of those systems. The freq field contains the frequency scan list.

Node Configuration Register

The Node Configuration Register contains the current NX node-side configuration. This register allows the NC to read and write certain of the NX configuration parameters.

TABLE 20

| Field | Type | Description |
|---|---|---|
| msl | i8 | Minimum Signal Level |
| osl | i8 | Optimal Signal Level |
| ospa | u8 | Optimal Signal Priority Adjustment |
| cpa | u8 | Connection Priority Adjustment |
| sai | u16 | Sector Acquisition Interval |
| sri | u16 | Sector Reassessment Interval |
| lfreq[32] | u32 | Local Scan List |

With reference to Table 20, the Node Configuration Register in accordance with an illustrative embodiment is defined. The msl value sets the minimum signal strength required for a channel to be included in the candidate channel list during sector acquisition. The osl value determines the minimum signal level at which a channel gives a sector a priority boost during candidate sector list construction, by adding the ospa value to the sector list priority. The cpa value determines the priority adjustment that the node will give to its current sector when its connected. The sai value determines how often, in seconds, the NX should attempt sector acquisition when disconnected, and the sri value determines how often, in seconds the NX should attempt sector acquisition when connected. The lfreq parameter includes a list of local frequencies that the NX should include during candidate channel list construction, in addition to the frequencies included in the freq attribute shown in Table 2 and Table 19.

Time Register

The Time Register describes the time and date at the most recent prior rising edge of the TMARK signal shown in Table 3.

TABLE 21

| Field | Type | Description |
|---|---|---|
| Frame | u16 | Frame Number (0-3839) |
| Utccor | i8 | UTC Correction in seconds |
| Tz | u8 | Current Timezone |
| Hour | u32 | GPS hour since Jan. 1, 2016 at frame 0 |
| Accuracy | u16 | Edge accuracy (uS) |

With reference to Table 21, the Time Register in accordance with an illustrative embodiment is defined. The frame field identifies the last frame header received prior to the TMARK edge. The utccor field indicates the current GPS-to-UTC correction, and the tz field indicates the current time zone. The hour field indicates the GPS hour of the last frame 0, specified as the number of hours since midnight, Jan. 1, 2016, The accuracy field indicates the accuracy, in microseconds, of the TMARK edge.

Firmware Image Register

The Firmware Image Register contains the NX executable firmware image, facilitating a firmware update over the NXI interface using the Erase, Write, Flush and Verify opcodes.

Commands

The NC queues commands to the NX through the Command register. When the NC needs to send a command, it executes a Write operation on the Command register and examines the result code. Each operation sends a new command.

Transmit Datagram Command

This transmit data command queues a reverse datagram for transmission to the network.

TABLE 22

| Field | Type | Description |
|---|---|---|
| code | u8 | 0x21 |
| flags | u8 | Flag Bits |
| rdid | u8 | Reverse Datagram ID |
| Fdid | u8 | Forward Datagram ID for reply |
| Faddr | u32 | Forward Address |
| data | Blob | Datagram Payload |

TABLE 23

| Bit | Name | Description |
|---|---|---|
| 0 | fast | Fast Aloha (if allowed) |
| 1 | reply | Reply |
| 2-4 | type | Message Type |
| 5-7 | R | Reserved for Future Use |

TABLE 24

| Value | Description |
|---|---|
| 0 | Short Reverse Datagram |
| 1 | Long Reverse Datagram |
| 2 | Long Encrypted Reverse Datagram |
| 3-7 | Reserved |

With reference to Table 22, the Transmit Datagram command in accordance with an illustrative embodiment is defined. The code field contains 0x21, identifying the command. The flags field determines type of datagram, whether it can make use of fast aloha randomization as defined in the current sector configuration, and whether the datagram is a reply to a forward datagram. The rdid specifies the reverse datagram identifier. If the reverse datagram is a reply, then the fdid and faddr fields specify the forward datagram being replied to, and the MAC address to which the forward datagram was sent. The data field contains the datagram payload.

With reference to Table 23, the flags field of the Transmit Datagram command in accordance with an illustrative embodiment is defined. The fast bit determines whether the NX should use normal or fast ALOHA rules to transmit the datagram. If fast is 1, the NX will attempt to use fast ALOHA rules. The reply flag specifies whether the datagram is a reply to a forward datagram. If reply is 1, then the datagram is a reply to the forward datagram described by the fdid and faddr fields (Table 22). The type field defines the type of datagram and the format of the data field (Table 22).

With reference to Table 24, the possible values of the type field in accordance with an illustrative embodiment are described. A value of 0 specifies a short datagram, with the first two bytes of the data field containing the datagram payload. A type of 1 or 2 indicates that the entire data field contains the datagram payload.

Reset Network Configuration Command

The Reset Network Configuration Command erases the current network configuration and replaces it with a minimal network configuration. This operation is intended as a provisioning step, enabling the NX to connect to a local system and receive new, more complete network configuration.

TABLE 25

| Field | Type | Description |
| --- | --- | --- |
| code | u8 | 0x20 |
| r[3] | u8 | Reserved (0) |
| paddr | u32 | Primary Address |
| hsystem | u16 | Home system |
| system | u16 | Scan system |
| freq | u32 | Scan frequency |
| key[16] | u8 | Primary Key Value |

With reference to Table 25 the Reset Network Configuration command in accordance with an illustrative embodiment is defined. The code field contains 0x20, identifying the command. The paddr field sets the NX's primary address, and the hsystem fields sets its home system ID. Together, system and freq set up a frequency table with one frequency and a system table with one system. The key value sets the device primary encryption key. Note that this operation effectively severs any existing sector connection.

Events

The NX queues events to the NC through the Event Register. When the register contains an event, the NX raises the ATTN signal. Once read by the NC, the event is removed from the Event Register and replaced with the next event (if any). When no events are available, the ATTN is low and Read Info operations on the Event Register return a size of 0.

Network Configuration Change Event

The Network Configuration Change Event notifies the NC that the NX's connection state has changed. The NC may read the Network Configuration Register for more information.

TABLE 26

| Field | Type | Description |
| --- | --- | --- |
| code | u8 | 0x40 |
| r[3] | u8 | Reserved |

Connection State Change Event

The Connection State Change Event notifies the NC that the NX's connection state has changed. The NC may read the Transceiver State Register for more information.

TABLE 27

| Field | Type | Description |
| --- | --- | --- |
| code | u8 | 0x41 |
| r[3] | u8 | Reserved |

Reverse Datagram Progress Event

The Reverse Datagram Progress Event notifies the NC that processing of a reverse datagram message has advanced or completed.

TABLE 28

| Field | Type | Description |
| --- | --- | --- |
| code | u8 | 0x42 |
| rdid | u8 | Reverse Datagram Identifier |
| action | i8 | Event Code |
| r | u8 | Reserved (0) |

TABLE 29

| Value | Description |
| --- | --- |
| ≥2 | Message Status - Reserved |
| 1 | Message Accepted into Transceiver Queue |
| 0 | Message Received by System |
| −1 | Message Failed - Transmission Queue Full |
| −2 | Message Failed - Long multicast response not allowed |
| −3 | Message Failed - Excessive Retries |
| −4 | Message Failed - Connection Closed |
| −5 | Message Failed - Message Too Long |
| −6 | Message Failed - Transaction Not Authorized |
| ≤−7 | Message Failed - Reserved |

With reference to Table 28, the Reverse Datagram Progress Event in accordance with an illustrative embodiment is defined. The code field contains 0x42, identifying the event. The rdid field specifies the reverse datagram identifier. The action field specifies the nature of the event, as shown in Table 30, with values greater than zero specifying intermediate progress, and values less than or equal to zero specifying the final status of the datagram.

Forward Datagram Event

The Forward Datagram Event notifies the NC that a forward datagram has been received.

TABLE 30

| Field | Type | Description |
| --- | --- | --- |
| code | u8 | 0x43 |
| fdid | u8 | Forward Datagram Identifier |
| type | u8 | Message type |
| R | u8 | Reserved for future use (0) |
| addr | u32 | Address |
| data | blob | Datagram payload |

TABLE 31

| Value | Description |
| --- | --- |
| 0 | Reserved |
| 1 | Long Reverse Datagram |
| 2 | Long Encrypted Reverse Datagram |
| 3-255 | Reserved |

With reference to Table 30, the Forward Datagram Event in accordance with an illustrative embodiment is defined. The code field contains 0x43, identifying the event. The fdid field specifies the forward datagram identifier. The type field specifies the type of datagram, as shown in table 31. The addr field specifies the datagram destination address, which will match the NX primary address or one of its multicast addresses. The data field contains the datagram payload. The size of the data field can be calculated from the size of the event, as determined by a Read Info operation on the Event Register or the eventsize field of the Interface Status Register.

Application Programming Interface (API)

The API FIG. 1 101 is based on gRPC and allows application servers to connect to a control stack and use the illustrative embodiment wireless network system. In this arrangement, the application server is the gRPC client, and the control stack is the gRPC server. Once authenticated, clients send datagrams to nodes and groups, receive datagrams from nodes, and perform limited management of nodes and groups. The API includes three communication methods (Send, Cancel, Receive) which enable the client to send datagrams to nodes and groups, and to receive datagrams from nodes. The API includes six management methods (ReadNode, UpdateNode, GetNodeAddressList, ReadGroup, UpdateGroup, GetGroupAddressList) which enable the client to read and update node and group records, and to correspondingly reconfigure nodes over-the-air. In accordance with an example embodiment, the above-described na value presents an advantage to API clients in the form of an estimated delivery time. For example, as shown in the below API interface proto file, when the application server sends a datagram, the SendResponse object that is returned by the control stack includes an "estimated_delivery_timestamp" field based on the na value that indicates when the client can expect the datagram to be delivered.

The API interface is described by the proto file as follows:

The example embodiments of the technical solutions described herein realize many advantages and overcome shortcomings of prior technologies that employ LPWANs. For example, in accordance with aspects of the example embodiments, the control stack, base transceivers and nodes are configured advantageously to provide a system wherein the API client sending data to a low-power node is advised about the when the datagram will be delivered, since the node may only awake to "listen" for messages every so often. In the example embodiments, this capability is possible because the system is synchronous, with frames transmitted according to GPS, and a fixed deterministic schedule of which frame the NX will attempt to decode. The delivery time may be earlier than this under some circumstances, or it may be later if the NX is out of range, but it nonetheless sets expectations for the client. If it sends a datagram and is advised that the datagram will be sent before 13:31 PM, then around that time, the client can start looking into plan B to do whatever it is doing.

In accordance with aspects of the example embodiments, the control stack, base transceivers and nodes are configured advantageously to provide a system wherein a node can be connected to a channel, but also listen and measure other channels while remaining connected, with minimal interference. This is important in narrowband systems, where there may be a large number of channels to deal with.

In accordance with aspects of the example embodiments, frame header includes several parts, including a frame information field and a sector information field. The sector information field largely relates to scanning and roaming, while the frame information largely relates to the present frame and connection. A narrowband node can look at sector information of other channels while minimally interrupting its control channel.

In accordance with aspects of the example embodiments, the control stack, base transceivers and nodes are configured advantageously to provide a system wherein the system's RF configuration is tagged by a nonce type number, which is transmitted as part of the frame header. This allows a node to maintain a cache of sector information, which means it will need to receive and decode sector configuration over the air less often as it scans for channels.

In accordance with aspects of the example embodiments, the control stack, base transceivers and nodes are configured advantageously to provide a system wherein the home location register and visited location register databases are tagged with a nonce type number, which is transmitted as part of the frame header. This allows a low-power node, which may sleep for long periods of time, to quickly ascertain whether it is still connected to the system, or whether databases have been recovered or re-initialized while it was in a low power state.

In accordance with aspects of the example embodiments, the control stack, base transceivers and nodes are configured advantageously to provide a system wherein base station locations can be published as a map, and a node uses this information to look for channels. In a large system based on narrowband channels, there may be a large number of total channels, but only a few channels in any given location. A node which has GPS for other reasons (ie, an asset tag on a shipping container) can use this information to dramatically reduce the number of channels to scan based on where it is and what base stations are around. In accordance with an example embodiment, the lfreq field allows this to happen.

In accordance with aspects of the example embodiments, a synchronization word that includes an unmodulated carrier can be employed, which allows the receiver in a node to efficiently sync to symbols and determine DC offset or frequency offset at the same time.

In addition, lockout channels are used in accordance with an illustrated embodiment in one area, are used for another protocol (e.g. P25 or DMR) in another area. The NX will see signal strength but be unable to find a frame header or decode the sector information field, and will add a row to its lockout table for some period of time. This will save battery over repeatedly scanning the channel.

In accordance with aspects of the example embodiments, a combination of a short interleaved block and a longer interleaved block are used in the data field of a frame, with addresses in the first block allowing a node to quickly power down its receiver if it is not being addressed, while protecting both blocks as much as possible through data interleaving.

It will be understood by one skilled in the art that this disclosure is not limited in its application to the details of construction and the arrangement of components set forth in the above description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

With regard to radio components of the illustrative devices, systems and methods employed in accordance with the illustrated embodiments, a radio receiver may be a superheterodyne receiver or a direct conversion receiver, or other type of receiver, implemented as an analog circuit, digital logic, or software, or as a combination of all three. A radio signal may be phase-, frequency-, or amplitude-modulated, or modulated in multiple ways or in other ways, to convey information from a transmitter to a receiver. Forward error correction includes block and convolutional codes, including Golay codes, BCH codes, Reed-Solomon codes, Turbo Codes, LDPC, and other systems for the purpose of detecting and correcting received data errors.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the illustrative embodiments can be easily construed as within the scope of claims exemplified by the illustrative embodiments by programmers skilled in the art to which the illustrative embodiments pertain. Method steps associated with the illustrative embodiments can be performed by one or more programmable processors executing a computer program, code or instructions to perform functions (e.g., by operating on input data and/or generating an output). Method steps can also be performed by, and apparatus of the illustrative embodiments can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of claims exemplified by the illustrative embodiments. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

Computer-readable non-transitory media includes all types of computer readable media, including magnetic storage media, optical storage media, flash media and solid state storage media. It should be understood that software can be installed in and sold with a central processing unit (CPU) device. Alternatively, the software can be obtained and loaded into the CPU device, including obtaining the software through physical medium or distribution system, including, for example, from a server owned by the software creator or from a server not owned but used by the software creator. The software can be stored on a server for distribution over the Internet, for example.

The above-presented description and figures are intended by way of example only and are not intended to limit the illustrative embodiments in any way except as set forth in the following claims. It is particularly noted that persons skilled in the art can readily combine the various technical aspects of the various elements of the various illustrative embodiments that have been described above in numerous other ways, all of which are considered to be within the scope of the claims.

The invention claimed is:

1. A method of operating a node in a digital time division multiple access and frequency division multiple access communication system wherein one or more base transceivers communicate with nodes in a low power wide area network (LPWAN) using radio frequency forward channels and radio frequency reverse channels, the LPWAN comprising sectors having respective sector identifiers and groups of forward channels and reverse channels assigned to each of the sectors, the method comprising:
- receiving frames in a forward channel in current use as a control for the node, each frame comprising a header and a data field, the header comprising a synchronization field, a sector information field, a resynchronization field, and a frame information field, the data field comprising data symbols for transmission to one or more addressed nodes;
- synchronizing to the frames and synchronization symbols in the forward channel and correcting frequency offset between the node and a base transceiver using information in the synchronization field and the frame information field in the header of a frame;
- synchronizing to and receiving the sector information field on a different forward channel during the synchronization field and the sector information field in the header of the frame; and
- resynchronizing to the control channel during the resynchronization field after synchronizing to and receiving the sector information field of the different forward channel.

2. The method of claim 1, further comprising
controllably operating the node in operation states chosen from a transmit state wherein the node transmits reverse channel data symbols that are synchronized to forward channel synchronization symbols from a base transceiver, a receive state wherein the node receives and decodes at least one forward channel, an indeterminate state during which the node may not be connected in a sector, and a low power sleep state during which the node is conserving power by not transmitting on a reverse channel or receiving on a forward channel.

3. The method of claim 2, further comprising:
- switching from the low power sleep state to the receive state;
- receiving sector configuration information comprising sector configuration version information from a base transceiver;
- comparing the received sector configuration version information with previously stored sector configuration version information at the node and determining whether the stored sector configuration information requires updating, and
- deferring receiving and decoding sector configuration information from the base transceiver until the stored sector configuration version information indicates that the stored sector configuration information requires updating.

4. The method of claim 2, further comprising:
- switching from the low power sleep state to the receive state;
- receiving system connection information comprising version information from a base transceiver;
- comparing the received version information with previously stored system connection version information at the node and determining whether the node has been disconnected from its sector, and
- initiating a connection packet transaction to reconnect with the sector.

5. The method of claim 2, wherein the data field has two interleaved blocks comprising a first block having address codewords indicating a primary address for an addressed node or a multicast address for an addressed group of nodes, and a second block having forward channel packet data and other information, the first block being configured with the address codewords and having a shorter length than the second block, the method further comprising:
- receiving and decoding a frame header for a frame;
- receiving and decoding at least the first block in the data field of the frame; and
- transitioning the node from the receive state to the lower power sleep state in response to determining that the address codewords do not correspond to an address of the node.

6. The method of claim 1, further comprising:
- storing node configuration data comprising a system identifier for a home network associated with the node comprising one or more base transceivers from which the node can receive data symbols on forward channels, and a list of forward channel radio frequencies to be scanned by the node during a sector acquisition process;
- scanning frequencies in the node configuration data list of forward channel radio frequencies for a designed time period and measuring their respective received signal strengths; and
- generating a candidate forward channel list by removing frequencies from the node configuration data list whose received signal strengths fail to meet a designated received signal strength threshold.

7. The method of claim 6, further comprising:
- tuning a node receive subsystem to frequencies in the candidate forward channel list and attempting to receive and decode sector information field provided in forward channel a frame header by a base transceiver;
- adding the frequencies to a frequency lockout list when the sector information field cannot be successfully decoded or when a decoded system identifier in a successfully decoded sector information field does not correspond to the system identifier in the node configuration data; and
- adding a sector identifier to the candidate sector list when it has been decoded from the sector information field and not added to the lockout list.

8. The method of claim 7, further comprising connecting to a sector selected from the candidate sector list using a connection packet transaction.

9. The method of claim 8, further comprising determining a priority among sector identifiers in the candidate sector list based on criteria chosen from system priority value, sector priority value, and relative signal strength measurements.

10. The method of claim 1, further comprising:
- storing node configuration data comprising a system identifier for a home network associated with the node, and a list of forward channel radio frequencies to be scanned by the node during a sector acquisition process;
- wherein, when the node is connected to a sector, the node processing device is configured to perform the sector acquisition process via the candidate forward channel list construction by measuring received signal strengths of frequencies in the candidate forward channel list during a sector information field of forward channel frame headers.

* * * * *